(12) United States Patent
Baumbach et al.

(10) Patent No.: US 12,508,418 B2
(45) Date of Patent: Dec. 30, 2025

(54) DEVICE AND METHOD FOR MONITORING THE STATE OF HEALTH OF A PATIENT

(71) Applicant: KARDION GMBH, Stuttgart (DE)

(72) Inventors: Hardy Baumbach, Stuttgart (DE); Julian Kassel, Böblingen (DE); Tjalf Pirk, Stuttgart (DE); Inga Schellenberg, Stuttgart (DE); Martina Budde, Karlsruhe (DE); Thomas Alexander Schlebusch, Renningen (DE)

(73) Assignee: KARDION GMBH, Stuttgart (DE)

( * ) Notice: Subject to any disclaimer, the term of this patent is extended or adjusted under 35 U.S.C. 154(b) by 1235 days.

(21) Appl. No.: 17/266,056

(22) PCT Filed: Aug. 7, 2019

(86) PCT No.: PCT/EP2019/071245
§ 371 (c)(1),
(2) Date: Oct. 13, 2021

(87) PCT Pub. No.: WO2020/030706
PCT Pub. Date: Feb. 13, 2020

(65) Prior Publication Data
US 2022/0032036 A1    Feb. 3, 2022

(30) Foreign Application Priority Data

Aug. 8, 2018  (DE) .................... 10 2018 213 350.6

(51) Int. Cl.
*A61M 60/585*  (2021.01)
*A61M 60/139*  (2021.01)
(Continued)

(52) U.S. Cl.
CPC ........ *A61M 60/585* (2021.01); *A61M 60/139* (2021.01); *A61M 60/17* (2021.01);
(Continued)

(58) Field of Classification Search
CPC .. A61M 60/585; A61M 60/531; A61M 60/17; A61M 60/139; A61M 60/422;
(Continued)

(56) References Cited

U.S. PATENT DOCUMENTS 3,088,323 A    5/1963   Welkowitz et al.
4,023,562 A    5/1977   Hynecek et al.
(Continued)

FOREIGN PATENT DOCUMENTS

CA    3 122 415    7/2020
CN    1192351 A    9/1998
(Continued)

OTHER PUBLICATIONS

Hertz Ph.D. et al, "Ultrasonic Engineering in Heart Diagnosis", The American Journal of Cardiology, Jan. 1967, vol. 19, No. 1, pp. 6-17.
(Continued)

*Primary Examiner* — Shirley X Jian
(74) *Attorney, Agent, or Firm* — Knobbe, Martens, Olson & Bear, LLP

(57) ABSTRACT

The invention relates to a device (150) for monitoring the state of health of a patient (100), wherein the device (150) comprises an input interface (160) for inputting a first pressure signal (145) and a second pressure signal (155) and a processing unit (165) for processing the first pressure signal (145) and the second pressure signal (155) in order to determine a processing value (170) in order to monitor the state of health of the patient (100) based the processing value (170).

26 Claims, 3 Drawing Sheets

(51) Int. Cl.
*A61M 60/17* (2021.01)
*A61M 60/178* (2021.01)
*A61M 60/216* (2021.01)
*A61M 60/422* (2021.01)
*A61M 60/531* (2021.01)
*A61M 60/592* (2021.01)

(52) U.S. Cl.
CPC ........ *A61M 60/178* (2021.01); *A61M 60/216* (2021.01); *A61M 60/422* (2021.01); *A61M 60/531* (2021.01); *A61M 60/592* (2021.01)

(58) Field of Classification Search
CPC .............. A61M 60/178; A61M 60/592; A61M 60/216; A61B 5/02007; A61B 5/02028
See application file for complete search history.

(56) References Cited

U.S. PATENT DOCUMENTS

| | | |
|---|---|---|
| 4,559,952 A | 12/1985 | Angelsen et al. |
| 4,680,730 A | 7/1987 | Omoda |
| 4,781,525 A | 11/1988 | Hubbard et al. |
| 4,888,011 A | 12/1989 | Kung et al. |
| 4,889,131 A | 12/1989 | Salem et al. |
| 4,902,272 A | 2/1990 | Milder et al. |
| 5,045,051 A | 9/1991 | Milder et al. |
| 5,269,811 A | 12/1993 | Hayes |
| 5,289,821 A | 3/1994 | Swartz |
| 5,456,715 A | 10/1995 | Liotta |
| 5,527,159 A | 6/1996 | Bozeman, Jr. et al. |
| 5,581,038 A | 12/1996 | Lampropoulos |
| 5,613,935 A | 3/1997 | Jarvik |
| 5,662,115 A | 9/1997 | Torp |
| 5,676,651 A | 10/1997 | Larson, Jr. et al. |
| 5,720,771 A | 2/1998 | Snell |
| 5,752,976 A | 5/1998 | Duffin et al. |
| 5,766,207 A | 6/1998 | Potter et al. |
| 5,827,203 A | 10/1998 | Nita |
| 5,865,759 A * | 2/1999 | Koblanski ................ A61B 7/00 600/508 |
| 5,888,242 A | 3/1999 | Antaki et al. |
| 5,904,708 A | 5/1999 | Goedeke |
| 5,911,685 A * | 6/1999 | Siess ................ F04D 29/047 600/16 |
| 5,964,694 A | 10/1999 | Siess et al. |
| 5,980,465 A | 11/1999 | Elgas |
| 6,007,478 A | 12/1999 | Siess et al. |
| 6,024,704 A | 2/2000 | Meador et al. |
| 6,053,873 A | 4/2000 | Govari et al. |
| 6,167,765 B1 | 1/2001 | Weitzel |
| 6,176,822 B1 | 1/2001 | Nix et al. |
| 6,183,412 B1 | 2/2001 | Benkowsi et al. |
| 6,185,460 B1 | 2/2001 | Thompson |
| 6,190,324 B1 | 2/2001 | Kieval et al. |
| 6,210,318 B1 | 4/2001 | Lederman |
| 6,231,498 B1 | 5/2001 | Pfeiffer et al. |
| 6,245,007 B1 | 6/2001 | Bedingham et al. |
| 6,314,322 B1 | 11/2001 | Rosenberg |
| 6,351,048 B1 | 2/2002 | Schob et al. |
| 6,398,734 B1 | 6/2002 | Cimochowski et al. |
| 6,432,136 B1 | 8/2002 | Weiss et al. |
| 6,438,409 B1 | 8/2002 | Malik et al. |
| 6,512,949 B1 | 1/2003 | Combs et al. |
| 6,530,876 B1 | 3/2003 | Spence |
| 6,540,658 B1 | 4/2003 | Fasciano et al. |
| 6,540,659 B1 | 4/2003 | Milbocker |
| 6,561,975 B1 | 5/2003 | Pool et al. |
| 6,579,257 B1 | 6/2003 | Elgas et al. |
| 6,602,182 B1 | 8/2003 | Milbocker |
| 6,605,032 B2 | 8/2003 | Benkowsi et al. |
| 6,652,447 B2 | 11/2003 | Benkowsi et al. |
| 6,731,976 B2 | 5/2004 | Penn et al. |
| 6,879,126 B2 | 4/2005 | Paden et al. |
| 6,912,423 B2 | 6/2005 | Ley et al. |
| 6,949,066 B2 | 9/2005 | Bearnson et al. |
| 6,984,201 B2 | 1/2006 | Khaghani et al. |
| 7,010,954 B2 * | 3/2006 | Siess ................ A61M 60/419 73/1.61 |
| 7,022,100 B1 | 4/2006 | Aboul-Hosn et al. |
| 7,024,244 B2 | 4/2006 | Muhlenberg et al. |
| 7,070,555 B2 | 7/2006 | Siess |
| 7,083,588 B1 | 8/2006 | Shmulewitz et al. |
| 7,138,776 B1 | 11/2006 | Gauthier et al. |
| 7,160,243 B2 | 1/2007 | Medvedev |
| 7,175,588 B2 | 2/2007 | Morello |
| 7,177,681 B2 | 2/2007 | Xhu |
| 7,238,151 B2 | 7/2007 | Frazier |
| 7,396,327 B2 | 7/2008 | Morello |
| 7,513,864 B2 | 4/2009 | Kantrowitz et al. |
| 7,520,850 B2 | 4/2009 | Brockway |
| 7,526,338 B1 * | 4/2009 | Gill ...................... A61B 5/0215 607/18 |
| 7,527,599 B2 * | 5/2009 | Hickey .................. A61B 7/026 600/587 |
| 7,591,777 B2 | 9/2009 | LaRose |
| 7,744,560 B2 | 6/2010 | Struble |
| 7,794,384 B2 | 9/2010 | Sugiura et al. |
| 7,819,916 B2 | 10/2010 | Yaegashi |
| 7,850,593 B2 | 12/2010 | Vincent et al. |
| 7,850,594 B2 | 12/2010 | Sutton et al. |
| 7,856,335 B2 | 12/2010 | Morello et al. |
| 7,862,501 B2 | 1/2011 | Woodward et al. |
| 7,951,062 B2 | 5/2011 | Morello |
| 7,951,129 B2 | 5/2011 | Chinchoy |
| 7,963,905 B2 | 6/2011 | Salmonsen et al. |
| 7,988,728 B2 | 8/2011 | Ayre |
| 8,075,472 B2 | 12/2011 | Zilbershlag et al. |
| 8,190,390 B2 | 5/2012 | Morello et al. |
| 8,211,028 B2 | 7/2012 | Karamanoglu et al. |
| 8,303,482 B2 | 11/2012 | Schima et al. |
| 8,323,173 B2 | 12/2012 | Benkowsi et al. |
| 8,435,182 B1 | 5/2013 | Tamura |
| 8,449,444 B2 | 5/2013 | Poirier |
| 8,545,380 B2 | 10/2013 | Farnan et al. |
| 8,585,572 B2 | 11/2013 | Mehmanesh |
| 8,591,393 B2 | 11/2013 | Walters et al. |
| 8,594,790 B2 | 11/2013 | Kjellstrom et al. |
| 8,622,949 B2 | 1/2014 | Zafirelis et al. |
| 8,657,733 B2 | 2/2014 | Ayre et al. |
| 8,657,875 B2 | 2/2014 | Kung et al. |
| 8,715,151 B2 | 5/2014 | Poirier |
| 8,747,293 B2 | 6/2014 | Arndt et al. |
| 8,849,398 B2 | 9/2014 | Evans |
| 8,864,643 B2 | 10/2014 | Reichenbach et al. |
| 8,864,644 B2 | 10/2014 | Yomtov |
| 8,876,685 B2 | 11/2014 | Crosby et al. |
| 8,882,477 B2 | 11/2014 | Fritz, IV et al. |
| 8,888,728 B2 | 11/2014 | Aboul-Hosn et al. |
| 8,897,873 B2 | 11/2014 | Schima et al. |
| 8,903,492 B2 | 12/2014 | Soykan et al. |
| 9,091,271 B2 | 7/2015 | Bourque |
| 9,297,735 B2 | 3/2016 | Graichen et al. |
| 9,308,305 B2 | 4/2016 | Chen et al. |
| 9,345,824 B2 | 5/2016 | Mohl et al. |
| 9,371,826 B2 | 6/2016 | Yanai et al. |
| 9,427,508 B2 | 8/2016 | Reyes et al. |
| 9,427,509 B2 | 8/2016 | Vodermayer |
| 9,474,840 B2 | 10/2016 | Siess |
| 9,492,601 B2 | 11/2016 | Casas et al. |
| 9,511,179 B2 | 12/2016 | Casas et al. |
| 9,555,173 B2 | 1/2017 | Spanier |
| 9,555,175 B2 | 1/2017 | Bulent et al. |
| 9,556,873 B2 | 1/2017 | Yanai et al. |
| 9,566,374 B2 | 2/2017 | Spence et al. |
| 9,636,442 B2 | 5/2017 | Karmon et al. |
| 9,656,010 B2 | 5/2017 | Burke |
| 9,669,142 B2 * | 6/2017 | Spanier ................ A61M 60/531 |
| 9,669,144 B2 | 6/2017 | Spanier et al. |
| 9,694,123 B2 | 7/2017 | Bourque et al. |
| 9,713,701 B2 | 7/2017 | Sarkar et al. |
| 9,744,282 B2 | 8/2017 | Rosenberg et al. |
| 9,789,236 B2 * | 10/2017 | Bonde ................ A61M 60/178 |
| 9,833,550 B2 | 12/2017 | Siess |

(56) References Cited

U.S. PATENT DOCUMENTS

| | | |
|---|---|---|
| 9,848,899 B2 | 12/2017 | Sliwa et al. |
| 9,849,224 B2 | 12/2017 | Angwin et al. |
| 9,878,087 B2 | 1/2018 | Richardson et al. |
| 9,943,236 B2 | 4/2018 | Bennett et al. |
| 9,950,102 B2 | 4/2018 | Spence et al. |
| 9,974,894 B2 | 5/2018 | Morello |
| 9,999,714 B2 | 6/2018 | Spanier et al. |
| 10,010,662 B2 | 7/2018 | Wiesener et al. |
| 10,022,480 B2 | 7/2018 | Greatrex et al. |
| 10,029,037 B2 | 7/2018 | Muller et al. |
| 10,052,420 B2 | 8/2018 | Medvedev et al. |
| 10,279,093 B2 | 5/2019 | Reichenbach et al. |
| 10,322,217 B2 | 6/2019 | Spence |
| 10,342,906 B2 | 7/2019 | D'Ambrosio et al. |
| 10,350,342 B2 | 7/2019 | Thomas et al. |
| 10,357,598 B2 | 7/2019 | Aboul-Hosn et al. |
| 10,376,162 B2 | 8/2019 | Edelman et al. |
| 10,413,651 B2 | 9/2019 | Yomtov et al. |
| 10,426,879 B2 | 10/2019 | Farnan |
| 10,449,275 B2 | 10/2019 | Corbett |
| 10,500,322 B2 | 12/2019 | Karch |
| 10,525,178 B2 | 1/2020 | Zeng |
| 10,549,020 B2 | 2/2020 | Spence et al. |
| 10,561,771 B2 | 2/2020 | Heilman et al. |
| 10,561,772 B2 | 2/2020 | Schumacher |
| 10,561,773 B2 | 2/2020 | Ferrari et al. |
| 10,632,241 B2 | 4/2020 | Schenck et al. |
| 10,660,998 B2 | 5/2020 | Hodges |
| 10,668,195 B2 | 6/2020 | Flores |
| 10,732,583 B2 | 8/2020 | Rudser |
| 10,857,275 B2 | 12/2020 | Granegger |
| 10,864,308 B2 | 12/2020 | Muller et al. |
| 11,027,114 B2 | 6/2021 | D'Ambrosio et al. |
| RE48,649 E | 7/2021 | Siess |
| 11,067,085 B2 | 7/2021 | Granegger et al. |
| 11,120,908 B2 | 9/2021 | Agnello et al. |
| 11,131,968 B2 | 9/2021 | Rudser |
| 11,147,960 B2 | 10/2021 | Spanier et al. |
| 11,154,701 B2 | 10/2021 | Reyes et al. |
| 11,154,702 B2 | 10/2021 | Kadrolkar et al. |
| 11,185,682 B2 | 11/2021 | Farnan |
| 11,191,945 B2 | 12/2021 | Siess et al. |
| 11,197,618 B2 | 12/2021 | Edelman et al. |
| 11,217,344 B2 | 1/2022 | Agnello |
| 11,235,139 B2 | 2/2022 | Kudlik |
| 11,241,572 B2 | 2/2022 | Dague et al. |
| 11,273,299 B2 | 3/2022 | Wolman et al. |
| 11,285,310 B2 | 3/2022 | Curran et al. |
| 11,285,311 B2 | 3/2022 | Siess et al. |
| 11,298,524 B2 | 4/2022 | El Katerji et al. |
| 11,311,711 B2 | 4/2022 | Casas et al. |
| 11,316,679 B2 | 4/2022 | Agnello |
| 11,320,382 B2 | 5/2022 | Aikawa |
| 11,324,395 B2 | 5/2022 | Banik et al. |
| 11,331,082 B2 | 5/2022 | Itoh et al. |
| 11,337,724 B2 | 5/2022 | Masubuchi et al. |
| 11,338,125 B2 | 5/2022 | Liu et al. |
| 11,351,356 B2 | 6/2022 | Mohl |
| 11,351,357 B2 | 6/2022 | Mohl |
| 11,351,358 B2 | 6/2022 | Nix et al. |
| 11,357,438 B2 | 6/2022 | Stewart et al. |
| 11,357,968 B2 | 6/2022 | El Katerji et al. |
| 11,376,415 B2 | 7/2022 | Mohl |
| 11,376,419 B2 | 7/2022 | Reyes et al. |
| 11,389,639 B2 | 7/2022 | Casas |
| 11,389,641 B2 | 7/2022 | Nguyen et al. |
| 11,413,444 B2 | 8/2022 | Nix et al. |
| 11,413,445 B2 | 8/2022 | Brown et al. |
| 11,420,041 B2 | 8/2022 | Karch |
| 11,439,806 B2 | 9/2022 | Kimball et al. |
| 11,446,481 B2 | 9/2022 | Wolman et al. |
| 11,478,629 B2 | 10/2022 | Harjes et al. |
| 11,517,740 B2 | 12/2022 | Agarwa et al. |
| 11,521,723 B2 | 12/2022 | Liu et al. |
| 11,524,165 B2 | 12/2022 | Tan et al. |
| 11,527,322 B2 | 12/2022 | Agnello et al. |
| 11,529,062 B2 | 12/2022 | Moyer et al. |
| 11,554,260 B2 | 1/2023 | Reyes et al. |
| 11,572,879 B2 | 2/2023 | Mohl |
| 11,574,741 B2 | 2/2023 | Tan et al. |
| 11,577,068 B2 | 2/2023 | Spence et al. |
| 11,581,083 B2 | 2/2023 | El Katerji et al. |
| 11,583,659 B2 | 2/2023 | Pfeffer et al. |
| 11,587,337 B2 | 2/2023 | Lemay et al. |
| 11,590,337 B2 | 2/2023 | Granegger et al. |
| 11,622,695 B1 | 4/2023 | Adriola et al. |
| 11,628,293 B2 | 4/2023 | Gandhi et al. |
| 11,639,722 B2 | 5/2023 | Medvedev et al. |
| 11,648,386 B2 | 5/2023 | Poirer |
| 11,653,841 B2 | 5/2023 | Reyes et al. |
| 11,666,746 B2 | 6/2023 | Ferrari et al. |
| 11,668,321 B2 | 6/2023 | Richert et al. |
| 11,674,517 B2 | 6/2023 | Mohl |
| 11,676,718 B2 | 6/2023 | Agnello et al. |
| 11,684,276 B2 | 6/2023 | Cros et al. |
| 11,684,769 B2 | 6/2023 | Harjes et al. |
| 11,694,539 B2 | 7/2023 | Kudlik et al. |
| 11,694,813 B2 | 7/2023 | El Katerji et al. |
| 11,696,782 B2 | 7/2023 | Carlson et al. |
| 11,707,617 B2 | 7/2023 | Reyes et al. |
| 11,712,167 B2 | 8/2023 | Medvedev et al. |
| 11,724,091 B2 * | 8/2023 | Siess .................. A61M 60/857 600/16 |
| 11,754,077 B1 | 9/2023 | Mohl |
| D1,001,145 S | 10/2023 | Lussier et al. |
| D1,001,146 S | 10/2023 | Lussier et al. |
| 11,771,885 B2 | 10/2023 | Liu et al. |
| 11,779,234 B2 | 10/2023 | Harjes et al. |
| 11,781,551 B2 | 10/2023 | Yanai et al. |
| 11,790,487 B2 | 10/2023 | Barbato et al. |
| 11,793,994 B2 | 10/2023 | Josephy et al. |
| 11,806,116 B2 | 11/2023 | Tuval et al. |
| 11,806,517 B2 | 11/2023 | Petersen |
| 11,806,518 B2 | 11/2023 | Michelena et al. |
| 11,813,079 B2 | 11/2023 | Lau et al. |
| 11,818,782 B2 | 11/2023 | Doudian et al. |
| 11,824,381 B2 | 11/2023 | Conyers et al. |
| 11,826,127 B2 | 11/2023 | Casas |
| 11,832,793 B2 | 12/2023 | McWeeney et al. |
| 11,832,868 B2 | 12/2023 | Smail et al. |
| 11,837,364 B2 | 12/2023 | Lee et al. |
| 11,844,592 B2 | 12/2023 | Tuval et al. |
| 11,844,940 B2 | 12/2023 | D'Ambrosio et al. |
| 11,850,073 B2 | 12/2023 | Wright et al. |
| 11,850,414 B2 | 12/2023 | Schenck et al. |
| 11,850,415 B2 | 12/2023 | Schwammenthal et al. |
| D1,012,284 S | 1/2024 | Glaser et al. |
| 11,857,345 B2 | 1/2024 | Hanson et al. |
| 11,864,878 B2 | 1/2024 | Duval et al. |
| 11,872,384 B2 | 1/2024 | Cotter |
| 11,883,207 B2 | 1/2024 | El Katerji et al. |
| D1,014,552 S | 2/2024 | Lussier et al. |
| 11,890,082 B2 | 2/2024 | Cros et al. |
| 11,896,199 B2 | 2/2024 | Lent et al. |
| 11,900,660 B2 | 2/2024 | Saito et al. |
| 11,903,657 B2 | 2/2024 | Geric et al. |
| 11,906,411 B2 | 2/2024 | Graichen et al. |
| 11,911,550 B2 | 2/2024 | Itamochi et al. |
| D1,017,634 S | 3/2024 | Lussier et al. |
| D1,017,699 S | 3/2024 | Moore et al. |
| 11,923,078 B2 | 3/2024 | Fallen et al. |
| 11,923,093 B2 | 3/2024 | Moffitt et al. |
| 11,925,794 B2 | 3/2024 | Malkin et al. |
| 11,931,073 B2 | 3/2024 | Walsh et al. |
| 11,931,528 B2 | 3/2024 | Rohl et al. |
| 11,931,588 B2 | 3/2024 | Aghassian |
| 11,986,274 B2 | 5/2024 | Edelman |
| 12,017,076 B2 | 6/2024 | Tan et al. |
| 12,023,476 B2 | 7/2024 | Tuval et al. |
| 12,029,891 B2 | 7/2024 | Siess et al. |
| 12,059,559 B2 | 8/2024 | Muller et al. |
| D1,043,730 S | 9/2024 | Lussier et al. |
| D1,043,731 S | 9/2024 | Lussier et al. |
| 12,076,544 B2 * | 9/2024 | Siess .................. A61M 60/857 |

(56) References Cited

U.S. PATENT DOCUMENTS

| | | |
|---|---|---|
| 12,097,016 B2 | 9/2024 | Goldvasser |
| 12,102,815 B2 | 10/2024 | Dhaliwal et al. |
| 12,144,650 B2 | 11/2024 | Spanier et al. |
| 12,144,976 B2 | 11/2024 | Baumbach et al. |
| 12,178,554 B2 | 12/2024 | Stotz et al. |
| 12,179,009 B2 | 12/2024 | El Katerji et al. |
| 12,183,459 B2 | 12/2024 | Agnello et al. |
| 12,194,287 B2 | 1/2025 | Kassel et al. |
| 12,201,821 B2 | 1/2025 | Schlebusch et al. |
| 12,211,615 B2 | 1/2025 | Nix et al. |
| D1,060,379 S | 2/2025 | Lussier et al. |
| 12,213,771 B2 | 2/2025 | Curran et al. |
| 12,217,850 B2 | 2/2025 | Agnello |
| 12,222,267 B2 | 2/2025 | Stotz et al. |
| 12,251,551 B2 | 3/2025 | Liu et al. |
| 12,257,424 B2 | 3/2025 | Schlebusch et al. |
| 12,268,861 B2 | 4/2025 | D'Ambrosio et al. |
| 12,296,158 B2 | 5/2025 | Higgins et al. |
| 12,296,159 B2 | 5/2025 | Schilling et al. |
| 12,310,621 B2 | 5/2025 | Murphy |
| 12,310,708 B2 | 5/2025 | Schlebusch et al. |
| 12,311,160 B2 | 5/2025 | Schlebusch et al. |
| 12,324,906 B2 | 6/2025 | Baumbach et al. |
| 12,329,501 B2 | 6/2025 | Moyer et al. |
| 12,329,956 B2 | 6/2025 | Sunagawa |
| 12,329,959 B2 | 6/2025 | Hassan et al. |
| 12,343,518 B2 | 7/2025 | Tuval et al. |
| 2001/0016686 A1 | 8/2001 | Okada et al. |
| 2001/0037093 A1 | 11/2001 | Benkowski et al. |
| 2001/0039828 A1 | 11/2001 | Shin et al. |
| 2002/0022785 A1* | 2/2002 | Romano ............... A61B 5/029 600/526 |
| 2002/0082585 A1 | 6/2002 | Carroll et al. |
| 2002/0093412 A1 | 7/2002 | Morrison |
| 2002/0147495 A1 | 10/2002 | Petroff |
| 2002/0151761 A1 | 10/2002 | Viole et al. |
| 2003/0069465 A1 | 4/2003 | Benkowski et al. |
| 2003/0130581 A1 | 7/2003 | Salo et al. |
| 2003/0139643 A1 | 7/2003 | Smith et al. |
| 2003/0167002 A1 | 9/2003 | Nagar et al. |
| 2003/0191357 A1 | 10/2003 | Frazier |
| 2003/0199727 A1 | 10/2003 | Burke |
| 2004/0022640 A1* | 2/2004 | Siess .................. A61M 60/178 417/279 |
| 2004/0044266 A1 | 3/2004 | Siess et al. |
| 2004/0065143 A1 | 4/2004 | Husher |
| 2004/0124979 A1 | 7/2004 | Medema |
| 2004/0130009 A1 | 7/2004 | Tangpuz |
| 2004/0167376 A1 | 8/2004 | Peters et al. |
| 2004/0167410 A1 | 8/2004 | Hettrick |
| 2004/0225177 A1 | 11/2004 | Coleman et al. |
| 2004/0241019 A1 | 12/2004 | Goldowsky |
| 2004/0260346 A1 | 12/2004 | Overall et al. |
| 2005/0001324 A1 | 1/2005 | Dunn |
| 2005/0019167 A1 | 1/2005 | Nusser et al. |
| 2005/0107658 A1 | 5/2005 | Brockway |
| 2005/0126268 A1 | 6/2005 | Ouriev et al. |
| 2005/0267322 A1 | 12/2005 | LaRose |
| 2006/0030809 A1 | 2/2006 | Barzilay et al. |
| 2006/0108697 A1 | 5/2006 | Wang |
| 2006/0108901 A1 | 5/2006 | Mao-Chin et al. |
| 2006/0122583 A1 | 6/2006 | Pesach et al. |
| 2006/0196277 A1 | 9/2006 | Allen et al. |
| 2006/0229488 A1 | 10/2006 | Ayre et al. |
| 2006/0287600 A1 | 12/2006 | McEowen |
| 2006/0287604 A1* | 12/2006 | Hickey ............... A61B 5/6853 600/528 |
| 2007/0060787 A1 | 3/2007 | Peters et al. |
| 2007/0069354 A1 | 3/2007 | Dangelmaier |
| 2007/0073352 A1 | 3/2007 | Euler et al. |
| 2007/0088214 A1 | 4/2007 | Shuros et al. |
| 2007/0156006 A1 | 7/2007 | Smith et al. |
| 2007/0255352 A1 | 11/2007 | Roline et al. |
| 2007/0266778 A1 | 11/2007 | Corey et al. |
| 2007/0282209 A1 | 12/2007 | Lui et al. |
| 2007/0299325 A1 | 12/2007 | Farrell et al. |
| 2008/0015517 A1 | 1/2008 | Geistert et al. |
| 2008/0082005 A1 | 4/2008 | Stern et al. |
| 2008/0091239 A1 | 4/2008 | Johansson et al. |
| 2008/0097595 A1 | 4/2008 | Gabbay |
| 2008/0102096 A1 | 5/2008 | Molin et al. |
| 2008/0108901 A1 | 5/2008 | Baba et al. |
| 2008/0108930 A1 | 5/2008 | Weitzel et al. |
| 2008/0133006 A1 | 6/2008 | Crosby et al. |
| 2008/0146996 A1 | 6/2008 | Smisson |
| 2008/0210016 A1 | 9/2008 | Zwirn et al. |
| 2008/0248614 A1 | 10/2008 | Yang |
| 2008/0262289 A1 | 10/2008 | Goldowsky |
| 2008/0262361 A1 | 10/2008 | Gutfinger et al. |
| 2008/0269822 A1 | 10/2008 | Ljungstrom et al. |
| 2008/0275339 A1 | 11/2008 | Thiemann et al. |
| 2008/0306328 A1 | 12/2008 | Ercolani |
| 2009/0024042 A1 | 1/2009 | Nunez et al. |
| 2009/0025459 A1 | 1/2009 | Zhang et al. |
| 2009/0064755 A1 | 3/2009 | Fleischli et al. |
| 2009/0105799 A1 | 4/2009 | Hekmat et al. |
| 2009/0131765 A1 | 5/2009 | Roschak et al. |
| 2009/0204163 A1 | 8/2009 | Shuros et al. |
| 2009/0226328 A1 | 9/2009 | Morello |
| 2009/0312650 A1 | 12/2009 | Maile et al. |
| 2010/0010354 A1 | 1/2010 | Skerl et al. |
| 2010/0082099 A1 | 4/2010 | Vodermayer et al. |
| 2010/0087742 A1 | 4/2010 | Bishop et al. |
| 2010/0160801 A1 | 6/2010 | Takatani et al. |
| 2010/0219967 A1 | 9/2010 | Kaufmann |
| 2010/0222632 A1 | 9/2010 | Poirier |
| 2010/0222633 A1 | 9/2010 | Poirier |
| 2010/0222635 A1 | 9/2010 | Poirier |
| 2010/0222878 A1 | 9/2010 | Poirier |
| 2010/0268017 A1 | 10/2010 | Siess |
| 2010/0298625 A1 | 11/2010 | Reichenbach et al. |
| 2010/0324378 A1 | 12/2010 | Tran et al. |
| 2011/0004075 A1 | 1/2011 | Stahmann et al. |
| 2011/0022057 A1 | 1/2011 | Eigler et al. |
| 2011/0071336 A1 | 3/2011 | Yomtov |
| 2011/0144744 A1 | 6/2011 | Wampler |
| 2011/0160516 A1* | 6/2011 | Dague ................ A61M 60/876 600/16 |
| 2011/0172505 A1 | 7/2011 | Kim |
| 2011/0184301 A1 | 7/2011 | Holmstrom |
| 2011/0186943 A1 | 8/2011 | Pahl |
| 2011/0218435 A1 | 9/2011 | Srinivasan et al. |
| 2011/0230068 A1 | 9/2011 | Pahl |
| 2012/0022645 A1 | 1/2012 | Burke |
| 2012/0029408 A1 | 2/2012 | Beaudin |
| 2012/0084024 A1 | 4/2012 | Norcross, Jr. |
| 2012/0150089 A1 | 6/2012 | Penka et al. |
| 2012/0150291 A1 | 6/2012 | Aber |
| 2012/0197141 A1 | 8/2012 | Vanney |
| 2012/0203476 A1 | 8/2012 | Dam |
| 2012/0245404 A1 | 9/2012 | Smith |
| 2012/0247200 A1 | 10/2012 | Ahonen et al. |
| 2012/0310037 A1 | 12/2012 | Choi et al. |
| 2012/0330214 A1 | 12/2012 | Peters et al. |
| 2013/0041204 A1 | 2/2013 | Heilman et al. |
| 2013/0046129 A1 | 2/2013 | Medvedev et al. |
| 2013/0066141 A1 | 3/2013 | Doerr et al. |
| 2013/0072846 A1 | 3/2013 | Heide et al. |
| 2013/0116575 A1 | 5/2013 | Mickle et al. |
| 2013/0144379 A1 | 6/2013 | Najafi et al. |
| 2013/0289334 A1 | 10/2013 | Badstibner |
| 2013/0289376 A1 | 10/2013 | Lang |
| 2013/0303831 A1 | 11/2013 | Evans |
| 2013/0304404 A1 | 11/2013 | Dam |
| 2014/0005467 A1 | 1/2014 | Farnan et al. |
| 2014/0013852 A1 | 1/2014 | Brown et al. |
| 2014/0030122 A1 | 1/2014 | Ozaki |
| 2014/0100414 A1 | 4/2014 | Tamez et al. |
| 2014/0114202 A1 | 4/2014 | Hein et al. |
| 2014/0128659 A1 | 5/2014 | Heuring et al. |
| 2014/0200389 A1 | 7/2014 | Yanai et al. |
| 2014/0243688 A1 | 8/2014 | Caron et al. |
| 2014/0275720 A1 | 9/2014 | Ferrari |

(56) References Cited

U.S. PATENT DOCUMENTS

| | | | |
|---|---|---|---|
| 2014/0275727 A1* | 9/2014 | Bonde | A61M 60/178 600/16 |
| 2014/0296677 A1 | 10/2014 | McEowen | |
| 2014/0303426 A1 | 10/2014 | Kerkhoffs et al. | |
| 2014/0342203 A1 | 11/2014 | Elian | |
| 2015/0032007 A1 | 1/2015 | Ottevanger et al. | |
| 2015/0080743 A1 | 3/2015 | Siess | |
| 2015/0141832 A1 | 5/2015 | Yu et al. | |
| 2015/0141842 A1 | 5/2015 | Spanier et al. | |
| 2015/0157216 A1 | 6/2015 | Stigall et al. | |
| 2015/0174307 A1 | 6/2015 | Eckman et al. | |
| 2015/0190092 A1 | 7/2015 | Mori | |
| 2015/0196076 A1 | 7/2015 | Billingslea | |
| 2015/0201900 A1 | 7/2015 | Syed | |
| 2015/0250935 A1 | 9/2015 | Anderson et al. | |
| 2015/0273184 A1 | 10/2015 | Scott et al. | |
| 2015/0290372 A1 | 10/2015 | Muller et al. | |
| 2015/0306290 A1 | 10/2015 | Rosenberg et al. | |
| 2015/0306291 A1 | 10/2015 | Bonde et al. | |
| 2015/0307344 A1 | 10/2015 | Ernst | |
| 2015/0327921 A1 | 11/2015 | Govari | |
| 2015/0335804 A1 | 11/2015 | Marseille et al. | |
| 2015/0365738 A1 | 12/2015 | Purvis et al. | |
| 2016/0000983 A1 | 1/2016 | Mohl et al. | |
| 2016/0008531 A1 | 1/2016 | Wang et al. | |
| 2016/0022889 A1 | 1/2016 | Bluvshtein et al. | |
| 2016/0022890 A1 | 1/2016 | Schwammenthal et al. | |
| 2016/0045165 A1 | 2/2016 | Braido et al. | |
| 2016/0095968 A1 | 4/2016 | Rudser | |
| 2016/0101230 A1 | 4/2016 | Ochsner et al. | |
| 2016/0144166 A1 | 5/2016 | Decréet al. | |
| 2016/0151553 A1* | 6/2016 | Bonde | A61M 60/538 455/411 |
| 2016/0166747 A1 | 6/2016 | Frazier et al. | |
| 2016/0213828 A1 | 7/2016 | Sievers | |
| 2016/0250399 A1 | 9/2016 | Tiller et al. | |
| 2016/0278856 A1 | 9/2016 | Panescu | |
| 2016/0302672 A1* | 10/2016 | Kuri | A61B 5/02007 |
| 2016/0303299 A1 | 10/2016 | Muller | |
| 2016/0317043 A1* | 11/2016 | Campo | A61B 5/02007 |
| 2016/0338629 A1 | 11/2016 | Doerr | |
| 2017/0010144 A1 | 1/2017 | Lenner et al. | |
| 2017/0021070 A1 | 1/2017 | Petersen | |
| 2017/0049945 A1 | 2/2017 | Halvorsen et al. | |
| 2017/0086780 A1 | 3/2017 | Sokulin et al. | |
| 2017/0098491 A1 | 4/2017 | Ziaie et al. | |
| 2017/0112985 A1 | 4/2017 | Yomtov | |
| 2017/0128646 A1 | 5/2017 | Karch | |
| 2017/0136164 A1 | 5/2017 | Yeatts | |
| 2017/0202575 A1 | 7/2017 | Stanfield et al. | |
| 2017/0224279 A1 | 8/2017 | Cahan et al. | |
| 2017/0239407 A1 | 8/2017 | Hayward | |
| 2017/0258980 A1 | 9/2017 | Katsuki et al. | |
| 2017/0348470 A1 | 12/2017 | D'Ambrosio et al. | |
| 2017/0354812 A1 | 12/2017 | Callaghan et al. | |
| 2018/0064860 A1 | 3/2018 | Nunez et al. | |
| 2018/0078159 A1 | 3/2018 | Edelman et al. | |
| 2018/0093070 A1 | 4/2018 | Cottone | |
| 2018/0110910 A1 | 4/2018 | Rodemerk et al. | |
| 2018/0126053 A1 | 5/2018 | Zilbershlag | |
| 2018/0199635 A1 | 7/2018 | Longinotti-Buitoni et al. | |
| 2018/0250457 A1 | 9/2018 | Morello et al. | |
| 2018/0256796 A1 | 9/2018 | Hansen | |
| 2018/0256800 A1 | 9/2018 | Conyers et al. | |
| 2018/0264182 A1 | 9/2018 | Spanier et al. | |
| 2018/0280598 A1 | 10/2018 | Curran et al. | |
| 2018/0316209 A1 | 11/2018 | Gliner | |
| 2018/0326131 A1 | 11/2018 | Muller et al. | |
| 2018/0333059 A1 | 11/2018 | Casas | |
| 2018/0353667 A1 | 12/2018 | Moyer et al. | |
| 2018/0369469 A1 | 12/2018 | Le Duc De Lillers et al. | |
| 2019/0001038 A1 | 1/2019 | Yomtov et al. | |
| 2019/0054223 A1 | 2/2019 | Frazier et al. | |
| 2019/0083690 A1 | 3/2019 | Siess et al. | |
| 2019/0192752 A1 | 6/2019 | Tiller et al. | |
| 2019/0192753 A1 | 6/2019 | Liu et al. | |
| 2019/0209755 A1 | 7/2019 | Nix et al. | |
| 2019/0209758 A1 | 7/2019 | Tuval et al. | |
| 2019/0216995 A1 | 7/2019 | Kapur et al. | |
| 2019/0217002 A1 | 7/2019 | Urakabe | |
| 2019/0223877 A1 | 7/2019 | Nitzen et al. | |
| 2019/0240680 A1 | 8/2019 | Hayakawa | |
| 2019/0254543 A1 | 8/2019 | Hartholt et al. | |
| 2019/0282741 A1 | 9/2019 | Franano et al. | |
| 2019/0282744 A1 | 9/2019 | D'Ambrosio et al. | |
| 2019/0351117 A1 | 11/2019 | Cambronne et al. | |
| 2019/0351118 A1* | 11/2019 | Graichen | A61M 60/816 |
| 2020/0016309 A1 | 1/2020 | Kallenbach et al. | |
| 2020/0028376 A1 | 1/2020 | Ha | |
| 2020/0038567 A1 | 2/2020 | Siess et al. | |
| 2020/0060559 A1 | 2/2020 | Edelman et al. | |
| 2020/0069857 A1 | 3/2020 | Schwammenthal et al. | |
| 2020/0147283 A1 | 5/2020 | Tanner et al. | |
| 2020/0164125 A1 | 5/2020 | Muller et al. | |
| 2020/0164126 A1 | 5/2020 | Muller | |
| 2020/0253583 A1 | 8/2020 | Brisken et al. | |
| 2020/0312450 A1 | 10/2020 | Agnello et al. | |
| 2021/0268264 A1 | 9/2021 | Stotz | |
| 2021/0290087 A1 | 9/2021 | Schlebusch | |
| 2021/0290930 A1 | 9/2021 | Kasel | |
| 2021/0290933 A1 | 9/2021 | Stotz | |
| 2021/0339002 A1 | 11/2021 | Schlebusch et al. | |
| 2021/0339004 A1 | 11/2021 | Schlebusch et al. | |
| 2021/0346674 A1 | 11/2021 | Baumbach et al. | |
| 2021/0346675 A1 | 11/2021 | Schlebusch et al. | |
| 2021/0346676 A1 | 11/2021 | Schlebusch et al. | |
| 2021/0346677 A1 | 11/2021 | Baumbach et al. | |
| 2021/0346678 A1 | 11/2021 | Baumbach et al. | |
| 2021/0378623 A1 | 12/2021 | Budde | |
| 2021/0379359 A1 | 12/2021 | Schellenberg | |
| 2021/0379360 A1 | 12/2021 | Schellenberg | |
| 2021/0393944 A1 | 12/2021 | Wenning | |
| 2022/0016411 A1 | 1/2022 | Winterwerber | |
| 2022/0032032 A1 | 2/2022 | Schlebusch et al. | |
| 2022/0032036 A1* | 2/2022 | Baumbach | A61M 60/531 |
| 2022/0039669 A1 | 2/2022 | Schlebusch et al. | |
| 2022/0047173 A1 | 2/2022 | Stotz et al. | |
| 2022/0050037 A1 | 2/2022 | Stotz et al. | |
| 2022/0072298 A1 | 3/2022 | Spanier et al. | |
| 2022/0076807 A1 | 3/2022 | Agnello | |
| 2022/0079457 A1 | 3/2022 | Tuval et al. | |
| 2022/0105339 A1 | 4/2022 | Nix et al. | |
| 2022/0126085 A1 | 4/2022 | Farnan | |
| 2022/0126086 A1 | 4/2022 | Schlebusch et al. | |
| 2022/0142462 A1 | 5/2022 | Douk et al. | |
| 2022/0161019 A1 | 5/2022 | Mitze et al. | |
| 2022/0361762 A1* | 11/2022 | Lalancette | A61B 5/02156 |
| 2023/0173279 A1 | 6/2023 | Stigloher | |
| 2023/0191141 A1 | 6/2023 | Wenning et al. | |
| 2024/0011808 A1 | 1/2024 | Winzer et al. | |
| 2024/0074828 A1 | 3/2024 | Wenning | |
| 2024/0245902 A1 | 7/2024 | Schlebusch et al. | |
| 2025/0032773 A1 | 1/2025 | Baumbach et al. | |
| 2025/0121177 A1 | 4/2025 | West | |
| 2025/0143587 A1 | 5/2025 | Stotz | |
| 2025/0144397 A1 | 5/2025 | Kassel et al. | |
| 2025/0222247 A1 | 7/2025 | Schlebusch | |
| 2025/0235687 A1 | 7/2025 | Schlebusch et al. | |

FOREIGN PATENT DOCUMENTS

| | | |
|---|---|---|
| CN | 1222862 A | 7/1999 |
| CN | 1202871 C | 5/2005 |
| CN | 1661338 A | 8/2005 |
| CN | 101128168 | 2/2008 |
| CN | 101208045 | 6/2008 |
| CN | 101214158 | 7/2008 |
| CN | 101351237 | 1/2009 |
| CN | 101448535 | 6/2009 |
| CN | 101460094 | 6/2009 |
| CN | 101579233 | 11/2009 |
| CN | 201437016 | 4/2010 |
| CN | 101711683 | 5/2010 |
| CN | 201658687 | 12/2010 |

(56) References Cited

FOREIGN PATENT DOCUMENTS

| | | |
|---|---|---|
| CN | 102421372 | 4/2012 |
| CN | 102803923 | 11/2012 |
| CN | 103328018 | 9/2013 |
| CN | 103857326 | 6/2014 |
| CN | 103957957 | 7/2014 |
| CN | 104105449 | 10/2014 |
| CN | 104188687 | 12/2014 |
| CN | 106104229 | 11/2016 |
| CN | 106333707 | 1/2017 |
| CN | 206007680 | 3/2017 |
| CN | 107530479 | 1/2018 |
| CN | 107632167 | 1/2018 |
| CN | 109939282 | 6/2019 |
| CN | 209790495 | 12/2019 |
| CN | 210020563 | 2/2020 |
| CN | 215841206 | 2/2022 |
| CN | 217828630 | 11/2022 |
| CN | 219250364 | 6/2023 |
| CN | 118320294 | 7/2024 |
| CN | 113769260 | 9/2024 |
| CN | 118920928 | 11/2024 |
| DE | 195 20 920 | 12/1995 |
| DE | 198 21 307 | 10/1999 |
| DE | 100 59 714 | 5/2002 |
| DE | 100 60 275 | 6/2002 |
| DE | 101 44 269 | 3/2003 |
| DE | 102 26 305 | 10/2003 |
| DE | 10 2006 001 180 | 9/2007 |
| DE | 10 2009 007 216 | 8/2010 |
| DE | 10 2009 011 726 | 9/2010 |
| DE | 10 2009 025 464 | 1/2011 |
| DE | 10 2009 047 845 | 3/2011 |
| DE | 10 2011 106 142 | 12/2012 |
| DE | 20 2011 110 389 | 9/2013 |
| DE | 10 2015 004 177 | 10/2015 |
| DE | 10 2015 219 263 | 4/2017 |
| DE | 10 2015 222 199 | 5/2017 |
| DE | 20 2015 009 422 | 7/2017 |
| DE | 10 2012 207 042 | 9/2017 |
| DE | 10 2016 013 334 | 4/2018 |
| DE | 10 2018 208 536 | 12/2019 |
| DE | 10 2018 208 862 | 12/2019 |
| DE | 10 2018 208 916 | 12/2019 |
| DE | 10 2018 208 927 | 12/2019 |
| DE | 10 2018 208 945 | 12/2019 |
| DE | 10 2018 210 076 | 12/2019 |
| DE | 10 2018 212 153 | 1/2020 |
| DE | 10 2018 213 151 | 2/2020 |
| DE | 10 2018 213 350 | 2/2020 |
| DE | 10 2018 220 658 | 6/2020 |
| DE | 10 2018 222 505 | 6/2020 |
| DE | 10 2020 102 473 | 8/2021 |
| DE | 11 2020 003 151 | 3/2022 |
| EP | 0 794 411 | 9/1997 |
| EP | 0 916 359 | 5/1999 |
| EP | 1 062 959 | 12/2000 |
| EP | 1 339 443 | 11/2001 |
| EP | 1 011 803 | 9/2004 |
| EP | 1 354 606 | 6/2006 |
| EP | 2 143 385 | 1/2010 |
| EP | 2 175 770 | 4/2010 |
| EP | 2 187 807 | 6/2012 |
| EP | 2 570 143 | 3/2013 |
| EP | 2 401 003 | 10/2013 |
| EP | 1 871 441 | 11/2014 |
| EP | 2 859 911 | 4/2015 |
| EP | 2 213 227 | 8/2016 |
| EP | 2 835 141 | 8/2016 |
| EP | 3 088 016 | 11/2016 |
| EP | 2 585 129 | 3/2017 |
| EP | 2 945 661 | 11/2017 |
| EP | 2 136 861 | 12/2017 |
| EP | 3 020 426 | 12/2017 |
| EP | 3 287 154 | 2/2018 |
| EP | 3 205 359 | 8/2018 |
| EP | 3 205 360 | 8/2018 |
| EP | 3 378 421 | 9/2018 |
| EP | 3 389 738 | 8/2019 |
| EP | 2 505 090 | 12/2019 |
| EP | 3 668 560 | 6/2020 |
| EP | 3 720 520 | 10/2020 |
| EP | 3 753 594 | 12/2020 |
| EP | 3 357 523 | 1/2021 |
| EP | 3 490 628 | 2/2021 |
| EP | 3 487 548 | 3/2021 |
| EP | 3 509 661 | 3/2021 |
| EP | 3 515 523 | 3/2021 |
| EP | 3 528 863 | 3/2021 |
| EP | 3 615 103 | 3/2021 |
| EP | 4 271 461 | 3/2021 |
| EP | 3 131 600 | 6/2021 |
| EP | 3 131 615 | 6/2021 |
| EP | 3 463 505 | 9/2021 |
| EP | 3 884 970 | 9/2021 |
| EP | 2 599 510 | 10/2021 |
| EP | 3 003 421 | 10/2021 |
| EP | 3 027 241 | 10/2021 |
| EP | 3 668 561 | 10/2021 |
| EP | 3 164 168 | 12/2021 |
| EP | 3 344 129 | 12/2021 |
| EP | 3 624 867 | 3/2022 |
| EP | 3 651 822 | 3/2022 |
| EP | 3 689 389 | 3/2022 |
| EP | 3 737 436 | 3/2022 |
| EP | 3 972 661 | 3/2022 |
| EP | 3 984 589 | 4/2022 |
| EP | 3 654 006 | 5/2022 |
| EP | 3 737 310 | 7/2022 |
| EP | 2 999 400 | 8/2022 |
| EP | 3 711 788 | 8/2022 |
| EP | 3 694 573 | 9/2022 |
| EP | 3 600 477 | 10/2022 |
| EP | 3 897 768 | 10/2022 |
| EP | 2 892 583 | 1/2023 |
| EP | 3 370 797 | 1/2023 |
| EP | 3 597 231 | 1/2023 |
| EP | 3 668 562 | 1/2023 |
| EP | 3 856 275 | 1/2023 |
| EP | 3 003 420 | 2/2023 |
| EP | 3 397 299 | 2/2023 |
| EP | 3 046 594 | 3/2023 |
| EP | 3 938 005 | 4/2023 |
| EP | 3 685 562 | 5/2023 |
| EP | 3 397 298 | 7/2023 |
| EP | 3 809 959 | 7/2023 |
| EP | 2 072 150 | 9/2023 |
| EP | 2 961 984 | 9/2023 |
| EP | 3 352 808 | 9/2023 |
| EP | 3 768 156 | 9/2023 |
| EP | 4 052 754 | 10/2023 |
| EP | 3 157 596 | 11/2023 |
| EP | 3 766 428 | 11/2023 |
| EP | 3 781 027 | 11/2023 |
| EP | 4 061 470 | 11/2023 |
| EP | 4 070 720 | 11/2023 |
| EP | 3 449 958 | 12/2023 |
| EP | 3 687 596 | 12/2023 |
| EP | 3 768 340 | 12/2023 |
| EP | 3 801 675 | 1/2024 |
| EP | 3 566 636 | 2/2024 |
| EP | 3 634 526 | 2/2024 |
| EP | 3 768 347 | 2/2024 |
| EP | 3 790 606 | 2/2024 |
| EP | 3 930 780 | 2/2024 |
| EP | 3 397 147 | 3/2024 |
| EP | 3 782 695 | 3/2024 |
| EP | 3 854 448 | 3/2024 |
| EP | 4 140 532 | 5/2024 |
| EP | 3 693 038 | 6/2024 |
| EP | 3 970 765 | 7/2024 |
| EP | 3 854 444 | 9/2024 |
| EP | 3 793 674 | 10/2024 |
| EP | 3 618 885 | 11/2024 |
| EP | 4 034 221 | 11/2024 |

(56) References Cited

FOREIGN PATENT DOCUMENTS

| | | |
|---|---|---|
| EP | 3 809 960 | 12/2024 |
| EP | 3 854 446 | 2/2025 |
| EP | 4 429 754 | 2/2025 |
| EP | 3 970 785 | 3/2025 |
| EP | 4 429 753 | 3/2025 |
| EP | 3 950 043 | 5/2025 |
| EP | 3 899 964 | 6/2025 |
| EP | 4 039 319 | 6/2025 |
| EP | 4 297 672 | 7/2025 |
| ES | 2 913 485 | 6/2022 |
| JP | S59-080229 | 5/1984 |
| JP | S61-125329 | 6/1986 |
| JP | S62-113555 | 7/1987 |
| JP | S62-204733 | 9/1987 |
| JP | S62-282284 | 12/1987 |
| JP | S64-68236 | 3/1989 |
| JP | H02-055886 | 2/1990 |
| JP | H02-234750 | 9/1990 |
| JP | H05-079875 | 3/1993 |
| JP | H06-218044 | 8/1994 |
| JP | H07-047025 | 5/1995 |
| JP | H08-057042 | 3/1996 |
| JP | H08-066398 | 3/1996 |
| JP | H08-327527 | 12/1996 |
| JP | H10-052489 | 2/1998 |
| JP | H10-505766 | 6/1998 |
| JP | H11-239617 | 9/1999 |
| JP | 2000-512191 | 9/2000 |
| JP | 2001-037728 | 2/2001 |
| JP | 2001-506140 | 5/2001 |
| JP | 2001-276213 | 10/2001 |
| JP | 2002-525175 | 8/2002 |
| JP | 2003-019197 | 1/2003 |
| JP | 2003-047656 | 2/2003 |
| JP | 2003-062065 | 3/2003 |
| JP | 2004-515278 | 5/2004 |
| JP | 2005-028137 | 2/2005 |
| JP | 2005-192687 | 7/2005 |
| JP | 2006-528006 | 12/2006 |
| JP | 2007-222644 | 9/2007 |
| JP | 2008-511414 | 4/2008 |
| JP | 2006-518249 | 8/2008 |
| JP | 2008-178690 | 8/2008 |
| JP | 2009-504290 | 2/2009 |
| JP | 2009-240348 | 10/2009 |
| JP | 2010-518907 | 6/2010 |
| JP | 2012-520157 | 9/2012 |
| JP | 2013-128792 | 7/2013 |
| JP | 2014-524274 | 9/2014 |
| JP | 2015-514529 | 5/2015 |
| JP | 2015-514531 | 5/2015 |
| JP | 2015-515429 | 5/2015 |
| JP | 2015-122448 | 7/2015 |
| JP | 2015-527172 | 9/2015 |
| JP | 2015-181800 | 10/2015 |
| JP | 2016-002466 | 1/2016 |
| JP | 2016-509950 | 4/2016 |
| JP | 2017-500932 | 1/2017 |
| JP | 2017-176719 | 10/2017 |
| JP | 2017-532084 | 11/2017 |
| JP | 2019-523110 | 8/2019 |
| JP | 2020-072985 | 5/2020 |
| WO | WO 89/006513 | 1/1989 |
| WO | WO 92/015239 | 9/1992 |
| WO | WO 94/009835 | 5/1994 |
| WO | WO 98/043688 | 10/1998 |
| WO | WO 00/033047 | 6/2000 |
| WO | WO 2006/122001 | 11/2006 |
| WO | WO 2010/142286 | 12/2010 |
| WO | WO 2010/143272 | 12/2010 |
| WO | WO 2012/018917 | 2/2012 |
| WO | WO 2012/112378 | 8/2012 |
| WO | WO 2013/160443 | 10/2013 |
| WO | WO 2014/042925 | 3/2014 |
| WO | WO 2014/141284 | 9/2014 |
| WO | WO 2014/165635 | 10/2014 |
| WO | WO 2015/085220 | 6/2015 |
| WO | WO 2016/001284 | 1/2016 |
| WO | WO 2016/066180 | 5/2016 |
| WO | WO 2016/137743 | 9/2016 |
| WO | WO 2017/032751 | 3/2017 |
| WO | WO 2017/066257 | 4/2017 |
| WO | WO 2017/106190 | 6/2017 |
| WO | WO 2017/147291 | 8/2017 |
| WO | WO 2017/214118 | 12/2017 |
| WO | WO 2018/005228 | 1/2018 |
| WO | WO 2018/048800 | 3/2018 |
| WO | WO 2018/109038 | 6/2018 |
| WO | WO 2018/213089 | 11/2018 |
| WO | WO 2019/013794 | 1/2019 |
| WO | WO 2019/034670 | 2/2019 |
| WO | WO 2019/034775 | 2/2019 |
| WO | WO 2019/078723 | 4/2019 |
| WO | WO 2019/126721 | 6/2019 |
| WO | WO 2019/137911 | 7/2019 |
| WO | WO 2019/193604 | 10/2019 |
| WO | WO 2019/219883 | 11/2019 |
| WO | WO 2019/229210 | 12/2019 |
| WO | WO 2019/229220 | 12/2019 |
| WO | WO 2019/234145 | 12/2019 |
| WO | WO 2019/234146 | 12/2019 |
| WO | WO 2019/234148 | 12/2019 |
| WO | WO 2019/234149 | 12/2019 |
| WO | WO 2019/234151 | 12/2019 |
| WO | WO 2019/234152 | 12/2019 |
| WO | WO 2019/234153 | 12/2019 |
| WO | WO 2019/234161 | 12/2019 |
| WO | WO 2019/234162 | 12/2019 |
| WO | WO 2019/234163 | 12/2019 |
| WO | WO 2019/234164 | 12/2019 |
| WO | WO 2019/234166 | 12/2019 |
| WO | WO 2019/234167 | 12/2019 |
| WO | WO 2019/234169 | 12/2019 |
| WO | WO 2019/243582 | 12/2019 |
| WO | WO 2020/030686 | 2/2020 |
| WO | WO 2020/030706 | 2/2020 |
| WO | WO 2020/064707 | 4/2020 |
| WO | WO 2020/089429 | 5/2020 |
| WO | WO 2020/198280 | 10/2020 |
| WO | WO 2020/243756 | 12/2020 |
| WO | WO 2023/040546 | 12/2021 |
| WO | WO 2022/074136 | 4/2022 |
| WO | WO 2022/109590 | 5/2022 |
| WO | WO 2022/173970 | 8/2022 |
| WO | WO 2023/226779 | 9/2022 |
| WO | WO 2023/049813 | 3/2023 |
| WO | WO 2024/104184 | 5/2024 |

OTHER PUBLICATIONS

International Preliminary Report on Patentability and Written Opinion received in PCT Application No. PCT/EP2019/071245, dated Dec. 8, 2020 in 14 pages.

International Search Report and Written Opinion received in PCT Application No. PCT/EP2019/071245, dated Jan. 13, 2020 in 14 pages.

Kong et al., "A Stein Equation Approach for Solutions to the Diophantine Equations," 2010 Chinese Control and Decision Conference, Xuzhou, May 26, 2010, pp. 3024-3028.

Koseli et al., "Online Viscosity Measurement of Complex Solutions Using Ultrasound Doppler Velocimetry", Turk J Chem, Jan. 2006, vol. 30, pp. 297-305.

McCormick et al., "Resolution of a 2/spl pi/Ambiguity Problem in Multiple Frequency Spectral Estimation," in IEEE Transactions on Aerospace and Electronic Systems, Jan. 1995, vol. 31, No. 1, pp. 2-8.

Syrmos et al., "A Generalized Bezout Equation in Output Feedback Design," Proceedings of the 31st IEEE Conference on Decision and Control, Tucson, AZ, USA, Dec. 1992, vol. 4, pp. 3590-3594.

Udesen et al., "A Simple Method to Reduce Aliasing Artifacts in Color Flow Mode Imaging", IEEE Ultrasonics Symposium, 2005, Rotterdam, The Netherlands, Sep. 18-21, 2005, pp. 1352-1355.

(56) References Cited

OTHER PUBLICATIONS

Vollkron et al., "Advanced Suction Detection for an Axial Flow Pump", Artificial Organs, 2006, vol. 30, No. 9, pp. 665-670.
Vollkron et al., "Development of a Suction Detection System for Axial Blood Pumps", Artificial Organs, 2004, vol. 28, No. 8, pp. 709-716.
Atkinson et al., "Pulse-Doppler Ultrasound and Its Clinical Application", The Yale Journal of Biology and Medicine, 1977, vol. 50, pp. 367-373.
Chung et al., "Improved Efficiency Characteristics of Wireless Power Charging System for Superconducting MAGLEV Train Using Inserted Permanent Magnets," 2018 IEEE International Symposium on Electromagnetic Compatibility, 2018, pp. 564-567.
"ECG Electrodes product comparison chart," 3M.com, 2018, https://multimedia.3m.com/mws/media/1490883O/red-dot-ecg-electrodes-comparison-chart.pdf, accessed May 18, 2025, 1 page.
Eeckhout, MD, PhD, et al., "Handbook of Complications During Percutaneous Cardiovascular Interventions", 2007 Informa UK Ltd., Ch. 12, pp. 167-177.
HeartMate 3™ Left Ventricular Assist System, Instructions for Use, Thoratec Corporation, Aug. 2017, pp. 536. [Uploaded in 3 parts].
Leguy et al., "Assessment of Blood Volume Flow in Slightly Curved Arteries from a Single Velocity Profile", Journal of Biomechanics, 2009, pp. 1664-1672.
Lombardi et al., "Flow Rate Profiler: an instrument to measure blood velocity profiles", Ultrasonics, 2001, vol. 39, pp. 143-150.
Mack-Haynes, Robin, "Fasteners Made Easy," New Mexico State University, https://pubs.nmsu.edu/_c/C232.pdf, accessed May 18, 2025, pp. 8.
Mullins, Charles E., MD, "Cardiac Catheterization in Congenital Heart Disease: Pediatric and Adult", Blackwell Futura, 2006, Chapters 3, 4 and 32, pp. 101.
Murali, Akila, "Design of Inductive Coils for Wireless Power Transfer to Pediatric Implants", A graduate project submitted in partial fulfillment of the requirements for the degree of Master of Science in Electrical Engineering, California State University, Northridge, May 2018, pp. 37.
Mushi et al., "Identification of Fluidic Element Models to Simulate the Short-Term Baroreflex", Proceedings of the 45th IEEE Conference on Decision & Control, San Diego, CA, Dec. 13-15, 2006, pp. 6.
Sigg et al., "Cardiac Electophysiology Methods and Models", Springer, Clinical Perspective: Electrophysiology in the Young and Patients with Congenital Heart Disease, Ch. 23, 2010, pp. 457-477.
Sinha et al., "Effect of Mechanical Assistance of the Systemic Ventricle in Single Ventricle Circulation with Cavopulmonary Connection", The Journal of Thoracic and Cardiovascular Surgery, Apr. 2014, vol. 147, No. 4, pp. 1271-1275.
Tan et al., "Surface Engineering and Patterning Using Parylene for Biological Applications." Materials, Mar. 15, 2010, vol. 3, No. 3, pp. 1803-1832.
"Understanding Hot-Wire Anemometry", Advanced Thermal Solutions, Inc., 2007, pp. 13-17.
Vieli, A., "Doppler Flow Determination", BJA: British Journal of Anaesthesia, 1988, vol. 60, pp. 107S-112S.
Yuanyuan et al., "Characteristics Analysis for Doppler Ultrasound Blood Flow Signals", China Medical Device Information, 5(1), Feb. 28, 1999, pp. 36-42.
Zhang, Dabiao et al., "Design of Microwave Velocity and Distance Monitor System", Instrument Technique and Sensor, Hebei Normal University, Apr. 25, 2004, pp. 3.

* cited by examiner

DEVICE AND METHOD FOR MONITORING THE STATE OF HEALTH OF A PATIENT

BACKGROUND

Field

The invention is based on a device or a method described herein. The present invention also relates to a computer program described herein.

Description of the Related Art

In patient support systems, such as cardiac support systems, for example, a diagnosis of the patient's state of health is made on the basis of numerous measured values. The measurement results are often not precise and stable enough, however, and therefore do not allow a reliable and predictive assessment of the patient's state of health to the extent necessary or possible.

SUMMARY

Based on this, the underlying object of the invention is to further improve the devices and methods known in the state of the art and to provide the most precise possible acquisition of relevant parameters for patient monitoring and for operating a cardiac support system.

With this in mind, the approach presented here introduces a device, a method, and a corresponding computer program as described herein. Advantageous further developments and improvements are possible using the measures described herein.

The approach presented here provides a device for monitoring the state of health of the patient, wherein the device has the following features:
- an input interface for inputting a first pressure signal and a second pressure signal; and
- a processing unit for processing the first pressure signal and the second pressure signal to determine a processing value in order to monitor the state of health of the patient based on said processing value.

A state of health of a patient can be understood to be a parameter or an indication that describes or depicts a functionality of an organ of the patient, for example, and thereby possibly provides an indication of physical impairment now or in the future which may also require treatment by a physician. In the present case, a pressure signal can be understood to be a value that represents a pressure in a medium. For example, the pressure signal can correspond to a blood pressure or an air pressure outside a patient. In the present case, a processing value can be understood to be a value or parameter that depicts or represents an indication or a degree of a state of health of the patient. This processing value makes easy, stable, reliable and long-term monitoring of the patient's state of health possible.

The approach presented here is based on the knowledge that a patient's state of health can be determined very reliably and easily by processing two pressure signals, for example in the form of a comparison or a calculation of the difference. For example, two pressure signals can be related to one another in terms of time or absolutely, for example to determine a pressure difference or a parameter of a pressure wave, for example of blood in a vessel of the patient, in order to thereby obtain an indication of an elasticity of a vascular wall or a degree of functionality of an organ of the patient and thus be able to monitor the state of health of the patient.

The patient's state of health can thus be monitored flexibly and cost-effectively from at least one aspect.

One embodiment of the approach proposed here advantageously includes the processing unit being configured to process the first pressure signal as a blood pressure value in a ventricle of the heart and the second pressure signal as a blood pressure value in the aorta of the patient. A blood pressure difference and/or a pulse wave velocity of a blood pulse wave or an elasticity of at least one blood vessel can be determined as the processing value to monitor the state of health of the patient. Such an embodiment of the approach proposed here has the advantage that a parameter enabling a statement to be made about the patient's state of health with a high degree of precision can be obtained as a processing value by technically simple and inexpensive means.

Also beneficial is an embodiment of the approach proposed here, in which the input interface is further configured to input a cardiac support blood flow value of an activated cardiac support system which represents a blood flow induced by the cardiac support system. The processing unit can furthermore also be configured to use the cardiac support blood flow value as the processing value to determine a performance value of the heart which corresponds to a pump power of the patient's heart minus the cardiac support blood flow value. Such an embodiment of the approach proposed here has the advantage of determining a residual power of the heart as the organ of the patient to be supported when an activated cardiac support system is being used, and from that being able to infer the current performance of the heart and predict any medical measures that may be required.

According to another embodiment of the approach proposed here, the input interface and the processing unit can also be configured to be disposed and operated outside the body to determine the processing value. Such an embodiment of the approach proposed here has the advantage that an energy supply of the input interface and/or the processing unit can be designed in a technically very simple manner, so that there is no need to route an energy supply line to a location in the patient that may be problematic to reach. The space required for a unit installed in the patient can furthermore be reduced if the pressure signals are evaluated outside the patient.

According to a further embodiment of the approach proposed here, the input interface and/or the processing unit can be designed as units that can be disposed or are disposed outside a building in which the patient is located, in particular wherein the input interface and/or the processing unit are designed as units of a cloud server or a computer unit that can be contacted via an Internet connection. Such an embodiment of the approach proposed here has the advantage of central monitoring of the state of health of the patient, whereby algorithms for linking the pressure signals to determine the processing value can also be changed very quickly and easily, for example, if this appears to be necessary based on more recent medical or physiological findings. At the same time, the patient can be monitored quickly and in real time and, if it is detected that the patient is in a critical state of health, for example, emergency services can be alerted.

In order to be able to undertake a longer-term monitoring of the patient or the patient's state of health, according to a further embodiment of the approach proposed here, the input interface and/or the processing unit can be configured to input a first and a second pressure signal at repeated time intervals and determine a processing value, wherein the processing unit is further configured to store the determined processing values and compare them with one another, and in particular output an alarm signal if one or more of the processing values exceeds a threshold value.

To obtain an absolute value of the blood pressure in the patient, for example, according to a further embodiment of the approach presented here, the input interface can further be configured to input an ambient air pressure value as the first pressure signal, which in particular represents an ambient air pressure in the immediate vicinity of the patient, wherein the processing unit is configured to determine a blood pressure value of the patient relative to the ambient air pressure as the processing signal. The ambient air pressure can be subtracted from the blood pressure sensor value to determine the processing signal, for example. Such an embodiment of the approach proposed here is advantageous, for example, when the ambient air pressure around the patient changes. This can be caused by the effect of an air conditioning system, a pressure chamber, a change in weather conditions and/or geographic altitude, etc., on the environment or surroundings of the patient, for example. In such an embodiment, it is then possible to detect a falsification of the measurement result via a change in the ambient air pressure and take this into account, for example, when assessing the state of health.

Also conceivable is an embodiment of the approach proposed here in which the processing unit is configured to output a control signal to a cardiac support system based on the processing value and/or to output a data transmission signal to a central processing unit and/or a cloud server via an Internet connection as a processing value, in particular wherein the data transmission signal comprises at least one piece of information which was obtained from the first pressure signal and/or the second pressure signal by means of a data compression method. Such an embodiment of the approach proposed here has the advantage of making it possible to react very quickly to a change in the patient's state of health and/or a strain situation, to thus be able to bring about an immediate improvement in the patient's living situation.

Another embodiment of the approach presented here proposes a method for monitoring a state of health of the patient, wherein the method comprises the following steps:

inputting a first pressure signal and a second pressure signal; and processing the first pressure signal and the second pressure signal to determine a processing value in order to monitor the state of health of the patient based on said processing value.

This method can, for example, be implemented in software or hardware or in a mixed form of software and hardware in a control device, for example.

The approach presented here further creates a device that is configured to carry out, control and/or implement the steps of a variant of a method presented here in corresponding devices. This design variant of the invention in the form of a device also makes it possible to achieve the underlying object of the invention quickly and efficiently.

For this purpose, the device can comprise at least one computing unit for processing signals or data, at least one memory unit for storing signals or data, at least one interface with a sensor or an actuator for inputting sensor signals from the sensor or for outputting data or control signals to the actuator, and/or at least one communication interface for inputting or outputting data embedded in a communication protocol. The computing unit can be a signal processor, a microcontroller or the like, for example, whereas the memory unit can be a flash memory, an EEPROM or a magnetic memory unit. The communication interface can be configured to input or output data in a wireless and/or wired manner, whereby a communication interface that can input or output wired data can, for example, input or output said data electrically or optically from or to a corresponding data transmission line.

In the present case, a device can be understood to be an electrical device that processes sensor signals and outputs control and/or data signals as a function of said sensor signals. The device can comprise an interface that can be hardware and/or software-based. In the case of a hardware-based configuration, the interfaces can be part of a so-called system ASIC, for example, which contains the various functions of the device. However, it is also possible for the interfaces to be separate, integrated circuits or consist at least in part of discrete components. In the case of a software-based configuration, the interfaces can be software modules that are, for example, provided on a microcontroller alongside other software modules.

A computer program product or computer program having program code which can be stored on a machine-readable carrier or storage medium such as a semiconductor memory, a hard drive memory, or optical memory and is used to carry out, implement, and/or control the steps of the method according to one of the embodiments described above is also advantageous, in particular if the program product or program is executed on a computer or a device.

BRIEF DESCRIPTION OF THE DRAWINGS

Examples of the approach presented here are shown in the drawings and explained in more detail in the following description. The figures show.

DETAILED DESCRIPTION

In the following description of favorable design examples of the present invention, the same or similar reference signs are used for the elements shown in the various figures, which have a similar effect, whereby a repeated description of these elements is omitted.

Figure 1:
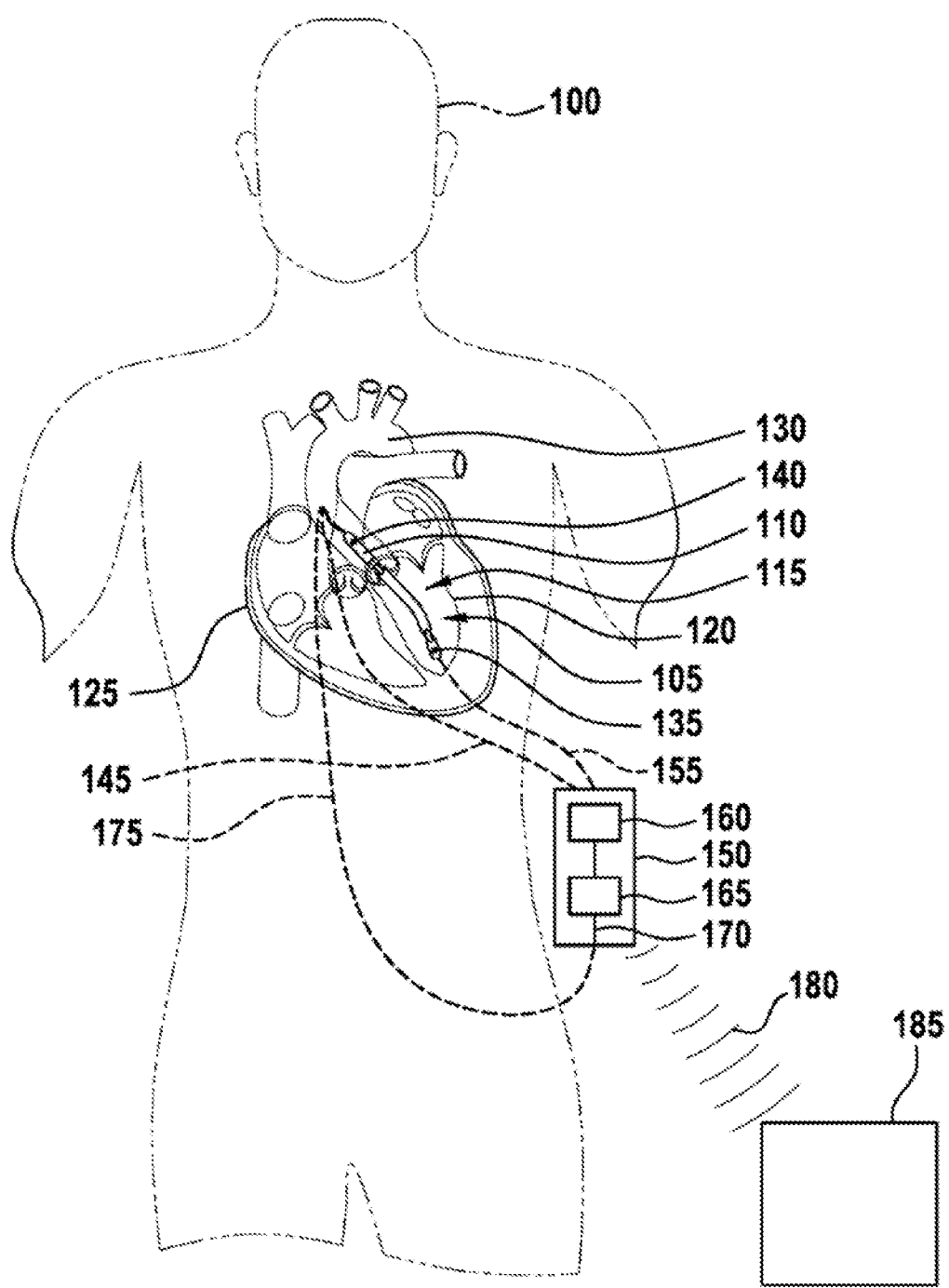
FIG. 1 an illustration of a patient implanted with an example of a cardiac support system which cooperates with a design example of the device for monitoring the state of health of the patient presented here.

FIG. 1 shows an illustration of a patient 100 implanted with an example of a cardiac support system 105 which cooperates with a design example of the device for monitoring the state of health of the patient 100 presented here. The cardiac support system 105 is shown in FIG. 1 only as an example in order to describe corresponding components of said cardiac support system 105 in more detail. In addition to a blood pump driven by a motor 110, the cardiac support system 105 comprises a blood guiding element 115 which can bring blood from a ventricle 120 of the heart 125 into the aorta 130 of the patient 100. A first pressure sensor 135 and a second pressure sensor 140 are disposed in the blood guiding element 115 (or a part thereof or parts adjacent to it), for example, whereby the first pressure sensor 135 sends a first pressure signal 145 to a device 150 for monitoring a state of health of the patient 100 according to one design example of the approach proposed here. The second pressure sensor 140 sends a second pressure signal 155, for example, to the device 150. The first pressure sensor 131 and the second pressure sensor 140 are disposed at a predetermined distance from one another in the blood guiding element 115, for example, so that they can register the blood pressure, blood pressure fluctuations or a pulse wave of blood, for example. The first pressure sensor 135 can be configured to transmit the first pressure signal 145 to the device 150 in the form of electromagnetic waves, i.e., wirelessly. The second pressure sensor 140 can analogously be configured to also transmit the second pressure signal 155 to the device 150 wirelessly and/or in the form of electromagnetic waves. The device 150 comprises an input interface 160, by means of which the first pressure signal 145 and the second pressure signal 155 can be inputted. The inputted pressure signals 145 and 155 are forwarded to a processing unit 165, in which a processing value 170 is determined, on the basis of which a state of health of the patient 100 can then be monitored. Such a processing value 170 can, for example, be a transit time of the pulse wave of blood between the first pressure sensor 135 and the second pressure sensor 140. Alternatively or additionally, such a processing value 170 can also be a parameter representing an elasticity of vascular walls such as a wall of the aorta 130, so that, using said parameter or processing value 170, the state of health of the patient can then also be assessed with respect to the elasticity of vascular walls, for example, to identify deposits or calcifications on inner walls of the vasculature.

It is also possible, for example, for the device 150 to output a control signal 175 as a function of the processing value 170 to control the motor 110 of the cardiac support system 105 to be able to set a desired blood pressure, or a blood pressure appropriate for specific activities (e.g., climbing stairs), for the patient 100.

It is furthermore also conceivable for a data transmission signal 180 to be transmitted (for example via an Internet connection) to a central processing unit 185 (for example in the form of a cloud server) on the basis of the processing value 170 or the first data signal 145 and/or the second data signal 155, in order to enable or simplify notification of a physician or an evaluation of the pressure signals 145 or 155.

In the design example of the present invention shown in FIG. 1, the device 150 is depicted as a device that can be worn externally on the patient 100, for example attached to a belt of the patient 100. On the other hand, it is also conceivable for the device 150 to be designed as an integral component of the cardiac support system 105, so that the first pressure signal 145 and/or the second pressure signal 155 can be transmitted in a wired manner. In this case, however, it must be ensured that the energy supply of the components of the device 150 is secured, either by means of a long-life battery or a suitable rechargeable battery, by routing a respective energy supply line for the device 150 or by transmitting electrical energy via electromagnetic fields to the device 150, which is then implanted in the patient 100. In a further embodiment, the component 150 can also be subdivided, so that the input interface 160 is disposed in an implanted control device, while the processing unit 165 is placed on the belt outside the patient, for example coupled via a radio link.

As discussed in more detail in the following, one of the pressure sensors 135 or 140 can be disposed outside the patient 100 as well, for example in the device 150 as shown in FIG. 1, and register an absolute air pressure, by means of which a standardization of the pressure value obtained from the other pressure sensor(s), which then preferably represents a blood pressure, can be carried out. This makes it possible to very reliably ensure an absolute blood pressure value of the blood pressure of the patient 100, in which systematic errors caused, for example, by a change of the ambient air pressure of the patient 100 (for example, when changing floors in a high-rise building, weather-based air pressure changes or topographic elevation) have been compensated. The patient's state of health can thus be determined very reliably in different environmental scenarios.

Figure 2:
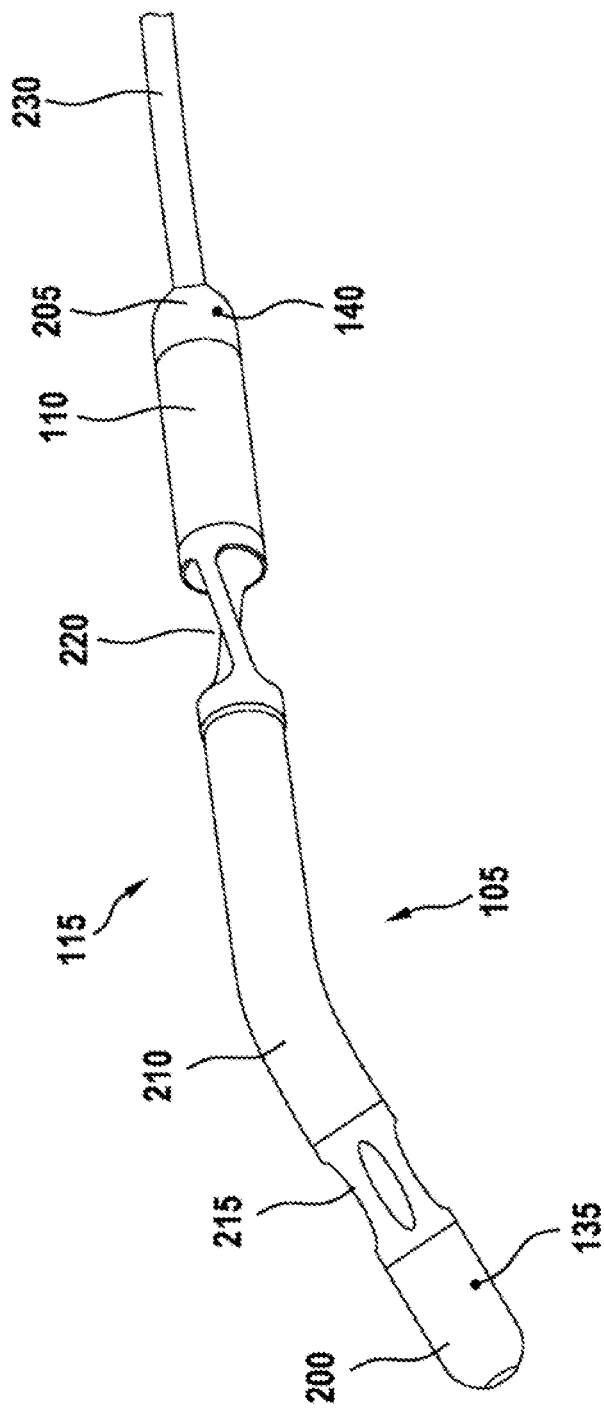
FIG. 2 a schematic illustration of a cardiac support system to be equipped with the pressure sensors shown in FIG. 1.

FIG. 2 shows a schematic illustration of a cardiac support system 105, which is to be equipped with the pressure sensors 135 and 140 shown in FIG. 1. The cardiac support system 105 can use absolute pressure sensors as the pressure sensors 135 and 140 to record a blood pressure curve including systole and diastole. One (or more) pressure sensor(s) 135 in a tip 200 of the cardiac support system 105 can record the pressure in the ventricle 120. If a further pressure sensor 140 is installed at the end 210 of the cardiac support system 105, both the aortic pressure and the differential pressure between the ventricle 120 and the aorta 130 can be determined. Since the measured values of the absolute pressure sensors as the pressure sensors 135 or 140 are a superposition of the blood pressure and the barometric ambient air pressure, according to one design example of the approach presented here, the ambient air pressure may be needed to determine the blood pressure as well. Said ambient air pressure can, for example, be provided by a separate system such as the device 150 shown in FIG. 1, but also by a smartphone, for example. The pressure signals can be processed in the control device or the device 150 as shown in FIG. 1, but also in cloud-based data processing if the device 150 is disposed in a corresponding cloud server 185 connected to the cardiac support system 105 via the Internet. To exclude tampering with data or control signals for the cardiac support system 105 as much as possible, the pressure signals 145 or 155 should be encrypted, for example using a cryptographic method, and sent to an extracorporeal evaluation unit such as the device 150 of FIG. 1. It is also conceivable for control signals to be sent from the extracorporeal evaluation unit, such as the device 150 of FIG. 1, to the cardiac support system 105 or components thereof, whereby here again these signals should advantageously be encrypted using a cryptographic method to protect against tampering. Continuous recording and evaluation of the blood pressure values allows an assertion to be made about the heart's 125 own capacity. The ability to determine the location of the patient 100 with a smartphone connected to the system or the device 150 provides the further advantages of a cloud-based evaluation of the blood pressure values.

FIG. 2 shows a schematic illustration of a cardiac support system 105. In the implanted state, the tip 200 and a suction hose 210 with an inlet region 215 for the blood are disposed in the ventricle. In the implanted state of the cardiac support system 105, all of the other parts beyond an outlet opening 220 are disposed in the aorta. The motor 110 provides blood circulatory support, whereby, in the illustration of FIG. 2, the motor 110 is disposed in the aorta. The "back end" 205 mentioned here and in the following is disposed the distal end of the motor 110. From there, an electrical lead 230 leads to a control unit or the device 150 according to one design example of the approach presented here. One or more absolute pressure sensors, such as the sensor 135, can be disposed in the tip 200 or another region of the system (200,

215, or 210) which, in the implanted state, is located in the ventricle. This makes it possible to determine the blood pressure in the ventricle.

One (or more) further pressure sensor(s) 140, which is/are disposed in the aorta, for example, can be used to measure the arterial blood pressure there. In principle, every part of the system in the aorta should be a possible application site for the pressure sensor(s) 140. According to another design example, the further pressure sensor 140 could also be integrated into the back end 205 of the motor 110. By using a plurality of pressure sensors 135, 140 which are disposed spatially apart from one another and, for example, at least partially in the region of the aorta (for example along a driveline), the propagation speed of pressure changes/pulse waves can be observed. If pressure sensors 135, 140 are used in both the ventricle and the aorta, an internal and/or an external control unit, for example the device 150 mentioned with reference to FIG. 1, can determine the differential pressure. Said differential pressure can be used, among other things, to set the motor output 110 and/or to determine the state of health of the patient 100.

Thus, using at least two pressure signals, the approach presented here can be used in several possible ways to examine the state of health of the patient 100 based on a processing value 170 determined from the pressure values or pressure signals 145 or 155. For example, the systolic and diastolic blood pressure can be determined in the ventricle 120 and in the aorta 130. A determination of the differential pressure between the ventricle 120 and the aorta 130 and/or an assessment of the heart's 125 own capacity/activity is conceivable as well. The determined processing value 170 can also be used to carry out an assessment of the elasticity of the blood vessels in the vicinity of the cardiac support system 105. It is also conceivable for a processing value 170 to be determined which enables an assessment of the pulse wave velocity as a measure for the condition of the patient 100 or an evaluation and calibration of the pressure signals of the pressure signals 145 and/or 155 in an extracorporeal control device. It is also advantageous if long-term recording and evaluation of blood pressure values takes place in a cloud or central learning for patient monitoring and possible early diagnosis of any changes in the state of health of the patient 100 can be expected. Also particularly advantageous is the determination of a processing value 170 from the pressure signals 145 and 155 for the use of altitude information from the (ambient) pressure sensor, possibly in combination with an activity and location determination of the patient 100, to create a movement and fitness profile of the patient 100 to improve the control of the cardiac support system 105, but also to increase the safety of the patient 100.

With the approach presented here, it is thus also possible to determine blood pressure in patients with a non-pulsatile cardiac support system 105. A normal blood pressure measurement using an upper arm cuff does not provide any information about the blood pressure. By using multiple pressure sensors, for example, the sensors 135 in the ventricle 120 or 145 in the region of the aorta 130 (e.g., along a driveline), the velocity of the pulsatile components of the blood pumped by the heart 125 can be determined and incorporated as a factor into the assessment of the condition of the patient 100. The propagation speed of changes in the pump power of the cardiac support system 105 can be taken into account here as well.

The approach presented here also makes it possible to determine the differential pressure between the ventricle 120 and the aorta 130. As a result, a better adjusted pump output can be set, and the condition of the heart 125 and the cardiac support system 105 can be assessed, because the pressure output and the motor output of the motor 110, for example, can be correlated. The pulsatile changes or reactions to changes in the pump power imposed by the remaining power of the heart 125 can be used to infer the remaining elasticity of the blood vessels in the region of the cardiac support system 105.

The use of threshold values can furthermore also minimize side effects of the cardiac support system 105 (for example, keep ventricular and aortic blood pressure within the physiological range).

Additionally, in one design example of the approach presented here, long-term monitoring in an extracorporeal system or a device, such as the device 150 shown in FIG. 1 or a cloud, allows trend detection via the heart's 125 own capacity, and thus an assessment of the state of health of the patient 100. According to a further design example, long-term monitoring of the ventricular pressure data also enables an assessment of the condition of the heart 125; the force of contraction of the heart 125, for example, can be ascertained by evaluating $\delta p/\delta t$ to determine the pressure increase at systole.

In a further design example, long-term monitoring of the end-diastolic pressure could also be used as a measure of the preload of the heart 125. Long-term monitoring of the pressure and motor data of the cardiac support system 105 can also be used as a measure of the remaining performance and lifespan of the cardiac support system 105.

According to a further design example, several or all values of the pressure sensors, i.e., of the pressure signals 145 or 155, can be transmitted from the intracorporeal control unit as the device 150 to an external device such as the cloud in order to prevent tampering with the pump or the cardiac support system 105 with respect to incorrect or abusive control of the pump output (in particular to ensure high IT security or to operate the cardiac support system 105 as an implant in read-only mode).

The cloud-based solution, especially in combination with a possible location determination of the patient 100, provides the option to increase blood flow, in particular for physically weaker patients 100, prior to strain, so that, for example, stairs can be negotiated more easily. In particular the altitude information that can be obtained from one of the pressure sensors 135 or 140 enables quick adjustment of support even without a cloud connection.

If many or all of the affected patients 100 are connected to the cloud, the algorithm can potentially predict dangerous strains on the hearts 125 of the patients and warn the patient 100, for example by learning specific patterns of the overall system, consisting of the physiological heart muscle 125 and the cardiac support system 105, and identifying said patterns early.

With real-time transmission of all data and immediate evaluation, the algorithm in the cloud can identify a potential failure of the cardiovascular system of the patient 100. In combination with the location determination, an ambulance can then be sent to the patient 100 in a fully automated manner. With this system, precious minutes can be gained in which rescue personnel are already on the way before a person accompanying the patient 100 makes the emergency call, or even before the person or patient 100 himself feels the life-threatening effects.

The ambient air pressure is still required, for example, to be able to determine the absolute blood pressure. FIG. 1 shows a simplified illustration of an implanted cardiac support system 105. The system 105 of FIG. 1 is located in the heart 125. It can also be connected via a lead to an intracorporeal control device or a device corresponding to the device 150 of FIG. 1. In this case, the pressure sensor for the ambient pressure is disposed in an extracorporeal component as the device 150, as shown in FIG. 1. In principle, the sensor signal could be transmitted as the first pressure signal 145 from the outside to the inside, i.e., from the device 150 shown in FIG. 1 to a device integrated into the cardiac support system 105, which is not explicitly shown in FIG. 1 for reasons of clarity. However, such a communication variant could allow tampering with the internal system, i.e., the cardiac support system 105. If the cardiac support system 105 is designed exclusively for communication from the inside out, tampering could be ruled out.

By combining cloud evaluation, location determination and blood pressure data, altitude profiles, walking speed and duration of the strain on the patient 100 can be synchronized very well with the respective occurring blood pressure values. Such an evaluation can help a physician to assess the state of health of the patient 100.

In one possible design example, the blood pressure data is acquired at a sampling rate in the range of 0.1 samples per second to 1000 samples per second, preferably with a sampling rate of 100 samples per second. In a further possible design example, the entire measurement data stream is transmitted from the intracorporeal system to the extracorporeal system. The measurement data can be compressed there, for example by lossy or loss-free compression.

Figure 3:
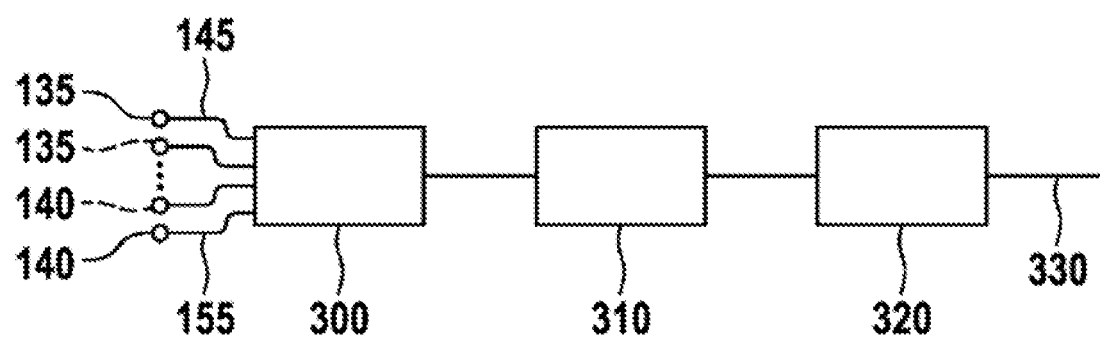
FIG. 3 a block diagram of an example of a compression method for streaming data, for example a blood pressure curve, to a cloud.

FIG. 3 shows a block diagram of an example of a compression method for streaming data, for example a blood pressure curve, to a cloud. Sensors (such as the pressure sensors 135 and 140 shown in FIG. 3) which are designed redundantly for reasons of reliability, for example, have obvious redundancy in the data signal, but the ventricular, aortic and ambient air pressure correlate as well. In order to minimize the bandwidth required to transmit data to the cloud, the data and/or the pressure signals 145 or 155 of the pressure sensors 135 or 140 can first be decorrelated in a decorrelation unit 300 and/or passed through a model-based predictor 310. A subsequent entropy coder 320 compresses the residual information of the blood pressure values and/or the pressure signals 145 and/or 155 before they are transmitted, for example as a compressed blood pressure curve 330, out of the patient 100 or into the cloud.

In addition to a model-based compression (with the predictor 320), as shown schematically in FIG. 3, a spectral compression, for example via a discrete cosine transformation or the use of wavelet filter banks, is possible as well.

Compression and transmission of the blood pressure curve using the pressure signals can take place in larger blocks of several seconds to minutes or continuously as a measurement data stream for instant display, for example on a physician's terminal. In one possible design example, the measurement data stream of (compressed and/or coded) pressure signals from the implanted sensors is already compressed in the implanted system or a cardiac support system 105 implanted in the patient 100 in order to reduce the required transmission bandwidth out of the body. In a further design example, several or all of the pressure sensors are designed redundantly. Redundant in this case means that at least two different or independent sensors can sense the same physiological variable. The sensor data of the redundant sensors can be transmitted as a whole. It is also possible to check whether the two sensor values are sufficiently identical (deviation below a threshold $\delta\epsilon$) in close proximity to the sensor. If the deviation is $|p_1-p_2|<\delta\epsilon$, only one sensor value is transmitted, for example an average value formed from the two values. If the deviation is outside the $\delta\epsilon$-range, an error code is transmitted. In the event of a fault, pressure signals can optionally still be transmitted in addition to the error code, for example the more plausible of the two pressures or the two pressures separately.

In a further design example, characteristic variables, for example diastolic, systolic and mean blood pressure, are already extracted from the blood pressure curve in the implanted cardiac support system 105 and transmitted to the extracorporeal system. The compensation of the air pressure and the further transmission or storage of the data takes place there. If there is strong variance in the blood pressure (e.g., due to large fluctuations in the air pressure resulting from technical systems such as defective air conditioners), the blood pressure data can be marked as invalid. For this purpose, the extracorporeal system identifies the fluctuation of the air pressure and compares it to a threshold value.

The selection of the operating mode (transmission of the blood pressure curve or the extracted characteristic parameters) can be based on fixed time intervals. For example, the averaged characteristic values are transmitted over a 5-minute interval and a detailed temporal progression of the blood pressure (blood pressure curve) is transmitted every 30 minutes for one minute. The selection of the operating mode can be triggered by the remote system (cloud, physician). Therefore, if the extracted characteristic parameters show abnormalities, the blood pressure curve can be obtained to carry out further diagnostics. Abnormalities could, for example, be a lack of sufficient pulsatility (difference between the diastolic and the systolic blood pressure), which could indicate a ventricular fibrillation, for example.

The measurement data can be obtained via a wireless modem (for example LoRa, NB-IoT, LTE, UMTS, GPRS) integrated into the device 150 or the cardiac support system. The use of the data connection of a portable mobile device (for example via Bluetooth, Wi-Fi or NFC) is possible as well. Routinely collected data can also initially be stored in the system (preferably the extracorporeal system) (in accordance with the methodology of a long-term ECG/Holter ECG). The stored data can be transmitted when a specific wireless network is available, at a specific time (e.g., at home at night) or in the physician's office. Here, too, the more current-intensive WAN wireless modem can be activated for immediate external assistance if an urgent need for action has been identified.

Figure 4:
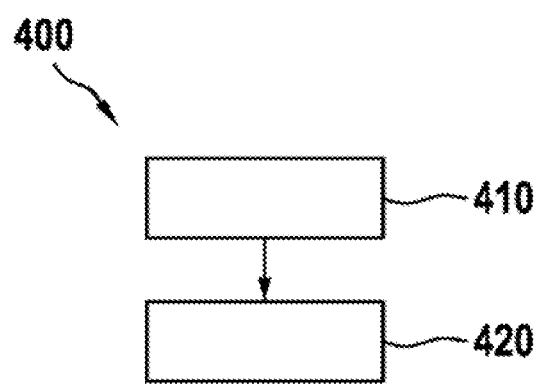
FIG. 4 a flow diagram of a method according to one design example.

FIG. 4 shows a flow diagram of a design example of the approach presented here as the method 400 for monitoring a state of health of the patient. The method 400 comprises a step 410 of inputting a first pressure signal and a second pressure signal and a step 420 of processing the first pressure signal and the second pressure signal to determine a processing value in order to monitor the state of health of the patient based on said processing value.

If a design example includes an "and/or" conjunction between a first feature and a second feature, this should be read to mean that the design example according to one embodiment comprises both the first feature and the second feature and, according to another embodiment, comprises either only the first feature or only the second feature.

The invention claimed is:
1. A cardiac support system comprising:
   an intravascular blood guiding device configured to be delivered to a heart of a patient via the vasculature and to be positioned across the aortic valve;
   a first pressure sensor and a second pressure sensor, wherein the first pressure sensor and the second pressure sensor are disposed at a predetermined distance from one another in the intravascular blood guiding device such that the first pressure sensor and the second pressure sensor are configured to be located in a ventricle and an aorta of the heart, respectively, when the intravascular blood guiding device is positioned across the aortic valve; and a monitoring device for monitoring a condition of a patient, the first pressure sensor configured to send a first pressure signal to the monitoring device, the second pressure sensor configured to send a second pressure signal to the monitoring device, the monitoring device comprising:

an input interface for receiving the first pressure signal and the second pressure signal; and a processing unit for processing the first pressure signal and the second pressure signal to determine a processing value indicative of the condition of the patient, wherein:

the monitoring device determines a change in a differential pressure between the ventricle and the aorta of a heart of the patient based at least in part on the first pressure signal and the second pressure signal, and wherein the monitoring device determines an elasticity of a blood vessel proximate to the cardiac support system based at least in part on the changes in the differential pressure;

the input interface is configured to receive a cardiac support blood flow value associated with the cardiac support system which represents a blood flow induced by the cardiac support system, wherein the processing unit is configured to use the cardiac support blood flow value as the processing value to determine a performance value of the heart; and the performance value is a pump power of the heart of the patient minus the cardiac support blood flow value.

2. The cardiac support system of claim 1, wherein the input interface and the processing unit are configured to be disposed and operated outside a body of the patient.

3. The cardiac support system of claim 1, wherein one of the input interface and the processing unit is configured to be disposed outside a building in which the patient is located.

4. The cardiac support system of claim 1, wherein the input interface or the processing unit is configured to be a unit of a cloud server or a computer unit that can communicate via an Internet connection.

5. The cardiac support system of claim 1, wherein the input interface is configured to receive the first pressure signal and the second pressure signal at predetermined time intervals, wherein the processing unit is configured to determine the processing values using the first pressure signal and the second pressure signal received at the predetermined time intervals, and wherein the processing unit is configured to store the processing values, compare them with one another, and output an alarm signal in response to one or more of the processing values exceeding a threshold value.

6. The cardiac support system of claim 1, wherein the processing unit is configured to output a control signal to the cardiac support system based at least in part on the processing value, wherein the processing unit is configured to output a data transmission signal as the processing value to a central processing unit or a cloud server via an Internet connection, and wherein the data transmission signal comprises at least one piece of information obtained from the first pressure signal or the second pressure signal via data compression.

7. The cardiac support system of claim 1, further comprising a motor configured to pump blood within the patient, wherein the processing unit is configured to generate a control signal based at least in part on the processing value, and wherein the control signal is configured to control operation of the motor.

8. The cardiac support system of claim 7, wherein the control signal is configured to control operation of the motor to reach a desired blood pressure.

9. The cardiac support system of claim 1, wherein the intravascular blood guiding device comprises a tip configured to be positioned in a ventricle when implanted, wherein the first pressure sensor is disposed on the tip, and wherein the first pressure signal is indicative of a ventricular pressure.

10. The cardiac support system of claim 9, wherein the first pressure signal comprises a systolic ventricular pressure and a diastolic ventricular pressure.

11. The cardiac support system of claim 1, wherein the intravascular blood guiding device comprises a motor configured to be positioned in the aorta when implanted, wherein the second pressure sensor is disposed on a back end of the motor, and wherein the second pressure signal is indicative of an aortic pressure.

12. The cardiac support system of claim 1, wherein the intravascular blood guiding device comprises:

a hose having an inlet configured to be located in the ventricle when implanted and an outlet located proximal to the inlet and configured to be located in the aorta when implanted; and a motor configured to be positioned in the aorta when implanted, wherein the first pressure sensor is located distally of the inlet for sensing a pressure in the ventricle, and wherein the second pressure sensor is located proximally to the outlet for sensing a pressure in the aorta.

13. A cardiac support system comprising:

an intravascular blood guiding device configured to be delivered to a heart of a patient via the vasculature and to be positioned across the aortic valve;

a first pressure sensor and a second pressure sensor, wherein the first pressure sensor and the second pressure sensor are disposed at a predetermined distance from one another in the intravascular blood guiding device such that the first pressure sensor and the second pressure sensor are configured to be located in a ventricle and an aorta of the heart, respectively, when the intravascular blood guiding device is positioned across the aortic valve; and a monitoring device for monitoring a condition of a patient, the first pressure sensor configured to send a first pressure signal to the monitoring device, the second pressure sensor configured to send a second pressure signal to the monitoring device, the monitoring device comprising:

an input interface for receiving the first pressure signal and the second pressure signal; and a processing unit for processing the first pressure signal and the second pressure signal to determine a processing value indicative of the condition of the patient, wherein:

the monitoring device determines a change in a differential pressure between the ventricle and the aorta of a heart of the patient based at least in part on the first pressure signal and the second pressure signal, and wherein the monitoring device determines an elasticity of a blood vessel proximate to the cardiac support system based at least in part on the changes in the differential pressure; and the input interface is configured to receive an ambient air pressure, and wherein the processing unit is configured to determine a blood pressure value of the patient based at least in part on the ambient air pressure.

14. The cardiac support system of claim 13, wherein the input interface and the processing unit are configured to be disposed and operated outside a body of the patient.

15. The cardiac support system of claim 13, wherein one of the input interface and the processing unit is configured to be disposed outside a building in which the patient is located.

16. The cardiac support system of claim 13, wherein the input interface or the processing unit is configured to be a unit of a cloud server or a computer unit that can communicate via an Internet connection.

17. The cardiac support system of claim 13, wherein the input interface is configured to receive the first pressure signal and the second pressure signal at predetermined time intervals, wherein the processing unit is configured to determine the processing values using the first pressure signal and the second pressure signal received at the predetermined time intervals, and wherein the processing unit is configured to store the processing values, compare them with one another, and output an alarm signal in response to one or more of the processing values exceeding a threshold value.

18. The cardiac support system of claim 13, wherein the processing unit is configured to output a control signal to the cardiac support system based at least in part on the processing value, wherein the processing unit is configured to output a data transmission signal as the processing value to a central processing unit or a cloud server via an Internet connection, and wherein the data transmission signal comprises at least one piece of information obtained from the first pressure signal or the second pressure signal via data compression.

19. The cardiac support system of claim 13, further comprising a motor configured to pump blood within the patient, wherein the processing unit is configured to generate a control signal based at least in part on the processing value, and wherein the control signal is configured to control operation of the motor.

20. The cardiac support system of claim 19, wherein the control signal is configured to control operation of the motor to reach a desired blood pressure.

21. The cardiac support system of claim 13, wherein the intravascular blood guiding device comprises a tip configured to be positioned in a ventricle when implanted, wherein the first pressure sensor is disposed on the tip, and wherein the first pressure signal is indicative of a ventricular pressure.

22. The cardiac support system of claim 21, wherein the first pressure signal comprises a systolic ventricular pressure and a diastolic ventricular pressure.

23. The cardiac support system of claim 13, wherein the intravascular blood guiding device comprises a motor configured to be positioned in the aorta when implanted, wherein the second pressure sensor is disposed on a back end of the motor, and wherein the second pressure signal is indicative of an aortic pressure.

24. The cardiac support system of claim 13, wherein the intravascular blood guiding device comprises:

a hose having an inlet configured to be located in the ventricle when implanted and an outlet located proximal to the inlet and configured to be located in the aorta when implanted; and a motor configured to be positioned in the aorta when implanted, wherein the first pressure sensor is located distally of the inlet for sensing a pressure in the ventricle, and wherein the second pressure sensor is located proximally to the outlet for sensing a pressure in the aorta.

25. A method for monitoring a condition of a patient using a cardiac support system, the method comprising:

inserting the cardiac support system within a heart of the patient across the aortic valve, wherein the cardiac support system comprises a first pressure sensor and a second pressure sensor disposed at a predetermined distance from the first pressure sensor, wherein the cardiac support system comprises a hose having an inlet and an outlet located proximal to the inlet;

receiving a first pressure signal of a ventricle of the heart and a second pressure signal of an aorta from the first pressure sensor and the second pressure sensor, respectively;

receiving data related to an ambient air pressure; and determining, based at least in part on the first pressure signal, the second pressure signal, and the ambient air pressure, a processing value representing an elasticity of vascular walls of the patient;

wherein the first pressure signal is indicative of a pressure in the ventricle of the heart of the patient at a location distal to the inlet, and wherein the second pressure signal is indicative of a pressure in the aorta of the heart of the patient at a location proximal to the outlet.

26. The method of claim 25 further comprising generating a control signal based at least in part on the processing value, the processing value configured to control operation of a motor of the cardiac support system.

* * * * *